(12) United States Patent
Leslie et al.

(10) Patent No.: US 11,614,395 B2
(45) Date of Patent: Mar. 28, 2023

(54) MINIATURIZED FLOW CELL AND SYSTEM FOR SINGLE-MOLECULE NANOCONFINEMENT AND IMAGING

(71) Applicant: The Royal Institution for the Advancement of Learning/McGill University, Montréal (CA)

(72) Inventors: Sabrina R. Leslie, Montréal (CA); Daniel J. Berard, Montréal (CA)

(73) Assignee: THE ROYAL INSTITUTION FOR THE ADVANCEMENT OF LEARNING/MCGILL UNIVERSITY, Montreal (CA)

(*) Notice: Subject to any disclaimer, the term of this patent is extended or adjusted under 35 U.S.C. 154(b) by 433 days.

(21) Appl. No.: 16/756,378

(22) PCT Filed: Oct. 16, 2018

(86) PCT No.: PCT/IB2018/058023
§ 371 (c)(1),
(2) Date: Apr. 15, 2020

(87) PCT Pub. No.: WO2019/077499
PCT Pub. Date: Apr. 25, 2019

(65) Prior Publication Data
US 2020/0240898 A1 Jul. 30, 2020

Related U.S. Application Data
(60) Provisional application No. 62/572,673, filed on Oct. 16, 2017.

(51) Int. Cl.
*G01N 15/14* (2006.01)
*B01L 3/00* (2006.01)
(Continued)

(52) U.S. Cl.
CPC ...... *G01N 15/1484* (2013.01); *B01L 3/50273* (2013.01); *B01L 3/502707* (2013.01);
(Continued)

(58) Field of Classification Search
CPC ..... B01L 2300/0654; B01L 2300/0816; B01L 2300/0867; B01L 2400/0481;
(Continued)

(56) References Cited

U.S. PATENT DOCUMENTS 10,048,193 B2    8/2018   Cohen et al.
2003/0178641 A1  9/2003   Blair et al.
(Continued)

FOREIGN PATENT DOCUMENTS

WO   2003/103835   12/2003
WO   2007/094817   8/2007
(Continued)

OTHER PUBLICATIONS

International Search Report; Canadian Intellectual Property Office; International Application No. PCT/IB2018/058023; dated Feb. 13, 2019; 4 pages.
(Continued)

*Primary Examiner* — Jennifer Wecker
(74) *Attorney, Agent, or Firm* — Fasken Martineau Dumoulin, LLP

(57) ABSTRACT

Nanofluidic flow cells and systems for single-molecule nanoconfinement and imaging of molecules in a fluid are described. The nanofluidic flow cell comprises a bottom substrate bonded to a top substrate, microchannels and a central chamber carved in the bottom or top substrate. The microchannels and the central chamber define an empty space into which a fluid can flow. The microchannels extend on opposite side of the central chamber, each microchannel comprising a central portion crossing the central chamber
(Continued)

and a pair of arms extending outside the central chamber, these arms comprising a fluid port positioned at opposite ends of the microchannel and outside the central chamber. The central chamber comprises a nanoconfinement and imaging area including carved nanostructures configured for single-molecule nanoconfinement. Also described are nanofluidic chips, methods of confinement, pneumatic-based nanofluidic systems and manifold assembly for the nanofluidic flow cell.

20 Claims, 20 Drawing Sheets

(51) Int. Cl.
  *G02B 21/32* (2006.01)
  *G01N 15/00* (2006.01)
  *B01L 9/00* (2006.01)
(52) U.S. Cl.
  CPC .............. *B01L 9/527* (2013.01); *G02B 21/32* (2013.01); *B01L 2300/0654* (2013.01); *B01L 2300/0816* (2013.01); *B01L 2300/0867* (2013.01); *B01L 2400/0481* (2013.01); *G01N 2015/0038* (2013.01)
(58) Field of Classification Search
  CPC ........... B01L 3/502707; B01L 3/50273; B01L 9/527; G01N 15/1484; G01N 2015/0038
  See application file for complete search history.

(56) References Cited

U.S. PATENT DOCUMENTS

2011/0070655 A1* 3/2011 Horiuchi .............. G01N 21/553
                                                      422/68.1
2012/0292496 A1  11/2012  Escobedo et al.
2017/0160188 A1   6/2017  Cohen et al.
2018/0002178 A1   1/2018  Yoon et al.
2018/0021781 A1   1/2018  Leslie et al.
2020/0055045 A1   2/2020  Leslie et al.

FOREIGN PATENT DOCUMENTS

| WO | 2008/134363 | 11/2008 |
| WO | 2012/016136 | 2/2012 |
| WO | 2012/094642 | 7/2012 |
| WO | 2017/009710 | 1/2017 |
| WO | 2018/083523 | 5/2018 |

OTHER PUBLICATIONS

Written Opinion of the International Searching Authority; Canadian Intellectual Property Office International Application No. PCT/IB2016/053551; dated Feb. 13, 2019; 5 pages.
S. R. Leslie et al. "Convex Lens-Induced Confinement for Imaging Single Molecules", Anal. Chem. 82, 6224 (2010), PMID: 20557026.
D. Berard et al. "Precision platform for convex lens-induced confinement microscopy", Rev. Sci. Instrum. 84, 103704 402 (2013).
D. J. Berard et al. "Formatting and ligating biopolymers using adjustable nanoconfinement", Applied Physics Letters 109, 033702 (2016).
D. J. Berard et al. "Convex lens-induced nanoscaie templating", Proc. Natl. Acad. Sci. 111, 13295 (2014).
S. Scott et al. "Visualizing structure-mediated interactions in supercoiled DNA molecules", Nucleic Acids Res. 46, 4622-4631 (2018).
Mahshid et al. "Development of a Platform for Single Cell Genomics Using Convex Lens-Induced Confinement", Lab on a Chip, vol. 15, pp. 3013-3020 (2015).

* cited by examiner

A)

B)

C)

10 µm

MINIATURIZED FLOW CELL AND SYSTEM FOR SINGLE-MOLECULE NANOCONFINEMENT AND IMAGING

CROSS REFERENCE TO RELATED APPLICATIONS

This application is a U.S. National Phase of International PCT application No. PCT/IB2018/058023 filed on Oct. 16, 2018, which claims the benefit of U.S. Provisional Application No. 62/572,673 filed on Oct. 16, 2017, the contents of each application hereby incorporated by reference in their entirety.

FIELD OF THE INVENTION

The invention relates to the field of molecular analysis and, more particularly, to a nanofluidic flow cell and system for confinement and imaging of molecules and nanoparticles.

BACKGROUND OF THE INVENTION

Methods for performing quick, reliable, high quality, and cost-effective molecular analyses, with applications such as genome sequencing and mapping, are in growing need, especially in the areas of diagnostics and therapeutics. This need is demonstrated by the rise in value of the genetic sequencing market in the last few years. Areas such as genetic screening, agro-genomics, forensics and biological research relies on current sequencing technology. However, leading current methods necessitate the shredding of long DNA strands into short fragments, thus increasing the bioinformatics expenses and obfuscating information such as gene rearrangements, de novo assemblies or sequence repeats which are central to understanding DNA and diagnosing genetic conditions like cancer. Analysis of contiguous individual molecules under single-molecule conditions, with high throughput and data quality is thus necessary to advance the field.

Today, no single existing sequencing or mapping technology is capable of characterizing the human genome in a single unit, without breaking it up, and with single-base accuracy. Second generation sequencing methods (e.g. Illumine®, which holds a monopoly on today's sequencing market) suffer from very short reads (hundreds of bases), making genome assembly computationally challenging and making it difficult or impossible to detect rearrangements, deletions, or repeats in the genome. Current third generation methods (e.g. Pacific Biosciences, Oxford Nanopore) offer read lengths of several kilobases, but suffer from high error rates (typically >10%). With this technology, many regions of the genome remain "dark" due to highly repetitive sequences, limiting commercial advances in health diagnostics as well as our genomic understanding of health and disease. Intrinsic error rates and short read lengths associated with each of today's genomic technologies impede their ultimate data quality.

One example approach to long-read DNA sequencing, which has been sought after for decades but not yet achieved due to limitations in molecular analysis and handling techniques, is transmission electron microscope (TEM) sequencing. The goal for this and other high-resolution microscopies (e.g. Atomic Force Microscope, AFM, or Surface Tunneling Microscope, STM) is to sequence long DNA strands by direct inspection—reading out each base pair along contiguous, extended DNA strands. For TEM analysis, for example, arrays of linearized DNA must be deposited on an ultra-thin electron-transparent surface, with high throughput, and within a small device footprint to be compatible with a TEM-holder and to be a scalable device technology. For transparency to the electron beam, the deposition-surface may be ultra-thin, for example sub 3-nm or as thin as a single atomic layer of graphene. TEM analysis is just one example of a potential high-resolution approach to acquiring high-quality, long-read sequencing data, which is limited by the lack of robust techniques for molecular isolation, chemical modification, manipulation, deposition, detection, and characterization, which all need to be addressed and overcome.

Beyond DNA sequencing, there are a wide range of applications in therapeutics and diagnostics which require new, single-molecule molecular analysis tools in order to overcome critical hurdles in the development of new drugs and functional assays. In particular, therapeutics based on antibody and nucleic acid interactions often face challenges in drug developability which arise from molecular aggregation. The way a drug interacts with native individual molecules, as opposed to with aggregates of molecules, can be very different. Being able to deconstruct these differences by isolating, manipulating, visualizing, and measuring the interactions between individual drugs and target molecules, for instance where the molecules are confined to arrays of nanowells, provides valuable data to inform the properties of therapeutics and thus enable their advancement. Today, measurements of drug-target interactions are typically performed on an ensemble level, which glosses over the properties of heterogeneous distributions of molecules (individuals, aggregates, etc.). Introducing single-molecule quality data in native-like conditions, and the ability to discriminate between different kinds of molecules in the analysis of molecular interactions, will enable rapid progress in the research and development of new therapeutics, as well as in their quality control.

At a fundamental level, applications ranging across DNA sequencing, diagnostics, and therapeutics have all been limited in acquiring single-molecule quality data with high contrast, long observation times, and native-like conditions. This has remained challenging for different reasons which depend upon the kind of microscopy being performed. In performing fluorescence microscopy, limitations include background fluorescence from out-of-focus molecules, drift of molecules in and out of the microscope's thin focal plane, and complex workflows for sample preparation. High signal-to-noise can be obtained at the expense of very short, typically sub-millisecond, observation times (e.g. confocal microscopy). Existing methods typically tether molecules to surfaces to immobilize them for observation (e.g. optical tweezers or Total Internal Reflection Microscopy, TIRF) which then introduce a bias on the available shapes and configurations of the molecules.

Microfluidic devices have been developed recently to confine molecules into nanoscale traps for improved observation. Examples of such devices include those described in patent publications US 2017/160,188 and US 2018/002178, and in the following scientific publications: S. R. Leslie et al. Anal. Chem. 82, 6224 (2010), PMID: 20557026; D. Berard et al., Rev. Sci. Instrum. 84, 103704 402 (2013; D. J. Berard et al., Appl. Phys. Lett. 109, 033702 (2016); D. J. Berard et al., Proc. Natl. Acad. Sci. 111, 13295 (2014); and S. Scott et al., Nucleic Acids Res. 46, 4622-4631 (2018).

Nevertheless, existing single-molecule fluorescence techniques and devices, including those above, face key limitations in sample consumption, data collection throughput, and/or remain cumbersome to implement. Therefore there is still a need for simpler and more user-friendly single-molecule imaging tools.

There is particularly a need for nanofluidic devices and imaging systems that provide a higher degree of reproducibility, and higher detailed control of the mechanical and fluid environment, while eliminating manual alignment and refocusing procedures.

There is a strong need for nanofluidic devices and imaging systems with improved stability and improved confinement gradient while greatly reducing the device size and simplifying current actuation mechanisms.

Such devices and imaging systems are needed to advance a wide range fields, including molecular biology, diagnostics, nanomaterials, and pharmaceuticals.

The present invention addresses these needs and other needs as it will be apparent from review of the disclosure and description of the features of the invention hereinafter.

BRIEF SUMMARY OF THE INVENTION

The invention relates to nanofluidic devices and imaging systems that may be helpful to advance single-molecule microscopy and application development across a wide range of fields, including, but not limited to, molecular biology, diagnostics, nanomaterials, and pharmaceuticals.

According to one aspect, the invention relates to a nanofluidic flow cell for single-molecule nanoconfinement and imaging of molecules in a fluid, comprising:
- a bottom substrate and a top substrate, the bottom and top substrate being bonded together;
- at least two spaced-apart microchannels and a central chamber carved in at least one of the bottom and top substrate, the microchannels and the central chamber defining an empty space into which a fluid can flow; said at least two microchannels extending on opposite side of the central chamber, each of said microchannels comprising a central portion crossing the central chamber and a pair of arms extending outside the central chamber, each arm comprising a fluid port positioned at opposite ends of the microchannel and outside the central chamber,
- wherein said central chamber comprises a nanoconfinement and imaging area, said area comprising a plurality of carved nanostructures configured for single-molecule nanoconfinement and imaging.

In embodiments the top substrate is flexible and adapted for being deflected at least over the central chamber, the deflection causing a gradual entrapment of molecules into the nanoconfinement and imaging area. In one particular embodiment, the defection occurs pneumatically.

According to another aspect, the invention relates to a sheet comprising a plurality of nanofluidic flow cells as defined herein. The sheet may be used as is or it may be cut into multiple pieces, each piece resulting in an individual flow cell.

According to another aspect, the invention relates to an imaging chip, comprising a carrier substrate onto which is bonded a nanofluidic flow cell as defined herein. The chip's carrier comprises at least four (4) reservoirs that connect to the fluid ports on the microchannels of the flow cell and a central bore defining a void over the central chamber of the flow cell.

According to another aspect, the invention relates to a nanofluidic system for single-molecule nanoconfinement of molecules in a fluid, comprising:
  a flow cell comprising:
    a bottom substrate and a top substrate, the bottom and top substrate being bonded together;
    at least two spaced-apart microchannels and a central chamber carved in at least one of the bottom and top substrate, the microchannels and the central chamber defining an empty space into which a fluid can flow;
    wherein the top substrate is flexible and adapted for being deflected pneumatically at least over the central chamber;
    wherein said central chamber comprises a nanoconfinement and imaging area, said area comprising a plurality of carved nanostructures configured for single-molecule nanoconfinement and imaging;
  a pneumatic system configured for exerting alternatively an air pressure and/or an air suction on an external surface said top substrate. In embodiments, the alternate air pressure and air suction provide, respectively, for a confinement and a circulation of molecules into the nanoconfinement and imaging area (e.g. nanostructures).

According to another aspect, the invention relates to a manifold assembly for a nanofluidic flow cell, the manifold assembly comprising:
  a rigid piece for removably loading the manifold assembly on an imaging microscope, said rigid piece comprising:
    a central empty space defining an area configured for receiving an imaging chip carrying a nanofluidic flow cell,
      said imaging chip comprising a carrier substrate onto which is bonded a nanofluidic flow cell,
      said flow cell comprising:
        at least two spaced-apart microchannels and a central chamber, said at least two microchannels extending on opposite side of the central chamber, each of said microchannels comprising a central portion crossing the central chamber and a pair of arms extending outside the central chamber, each arm comprising a fluid port positioned at opposite ends of the microchannel and outside the central chamber;
      said carrier substrate comprising at least four (4) reservoirs that connect to the fluid ports on the microchannels;
      said carrier further comprising a central bore defining a void over the central chamber of the flow cell;
    at least four (4) bores extending through the rigid piece, said bores being positioned for defining channels providing a fluid connection between said pair of fluid ports and an exterior of the rigid piece;
    a central bore extending inside the central empty space, said central bore being configured to be positioned over the central bore of the carrier and in air communication thereof;
    an air channel extending from the central chamber to an exterior of the rigid piece for providing an air communication between said exterior and the central bore inside the central empty space.

In embodiments the manifold assembly further comprises sealing means positioned inside the central space and between the carrier and the rigid piece, the sealing gasket providing a sealed connection between the flow cell and central space. Also, the manifold assembly may further comprise a mounting base surrounding the manifold, the mounting base being adapted for clamping to an imaging microscope.

According to another aspect, the invention relates to a method for nanoconfinement of molecules in a fluid, comprising:
- providing a flow cell comprising of a bottom substrate, a top substrate, a central chamber and at least one microchannel crossing said central chamber, wherein the central chamber and the at least one microchannel are carved in at least one of said bottom and top substrate to define an empty space into which a fluid can flow, wherein at least one of the bottom substrate and top substrate is flexible and adapted for being deflected pneumatically;
- loading a liquid sample comprising molecules into a fluid port positioned at one end of the microchannel while applying air pressure over an external surface of said flexible substrate, said air pressure preventing said liquid sample from entering the central chamber;
- releasing said air pressure and/or applying air suction over an external surface of said flexible substrate to increase a gap height between the flexible substrate and the central chamber and allow said liquid sample to flow from the microchannel into the central chamber; and
- applying air pressure over an external surface of said flexible substrate to close a gap between the flexible substrate and the central chamber and confine molecules, that are present in said liquid sample, in the central chamber. In embodiments, the method further comprises the step of applying pressure at the fluid port for controlling a flow of the fluid into the microchannel.

According to another aspect, the invention relates to a kit comprising: (a) at least one of (i) a nanofluidic flow cell as defined herein, and (iii) an imaging chip as defined herein; and (b) a manifold assembly for holding the at least one chip or flow cell, wherein the manifold assembly is adapted for microscopy. In embodiments, the manifold assembly is as defined herein.

According to another aspect, the invention relates to a pressurization system for single-molecule nanoconfinement of molecules in a fluid, comprising:
- a nanofluidic flow cell configured for single-molecule nanoconfinement of molecules in a fluid;
- a manifold assembly configured for operation with said nanofluidic cell;
- a pressurisation system fluidly coupled to the nanofluidic flow cell and the manifold assembly for applying air pressure and/or air suction over said nanofluidic flow cell;
- an imaging microscope for receiving the manifold assembly and for imaging molecules confined inside the flow cell.

Additional aspects, advantages and features of the present invention will become more apparent upon reading of the following non-restrictive description of preferred embodiments which are exemplary and should not be interpreted as limiting the scope of the invention.

BRIEF DESCRIPTION OF THE DRAWINGS (OR FIGURES)

In order that the invention may be readily understood, embodiments of the invention are illustrated by way of example in the accompanying drawings.

Figure 21:
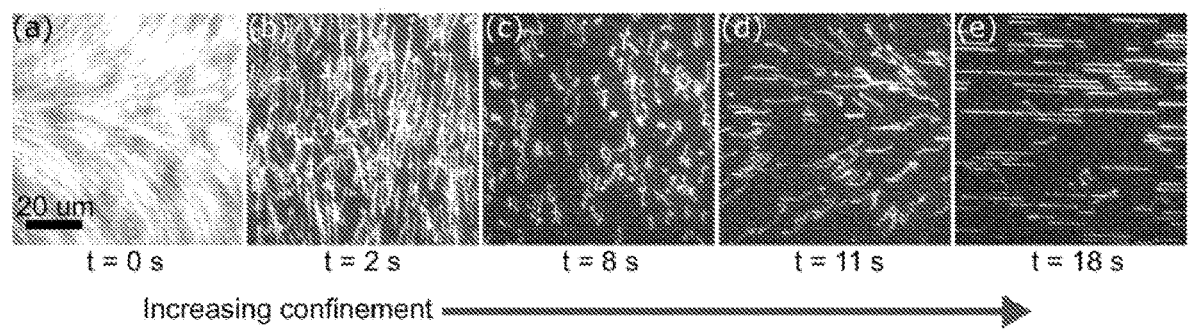

FIG. 21 is a panel of pictures showing a montage of λ DNA loading and linearization in nanogrooves within the miniaturized flow cell. (a): DNA is initially loaded into the microchannel region with suction applied to the membrane. The pressure is then increased to start increasing the confinement. (b) and (c): Increasing confinement causes the individual DNA molecules to become distinguishable. All molecules are confined within the focal plane of the objective. (d): DNA molecules begin to enter the nanogrooves. Confinement is applied more slowly to ensure gentle loading without DNA breakage. (e): Once maximum confinement is reached, DNA molecules are fully confined and linearized within the nanogrooves, suitable for individual analysis.

Figure 1:
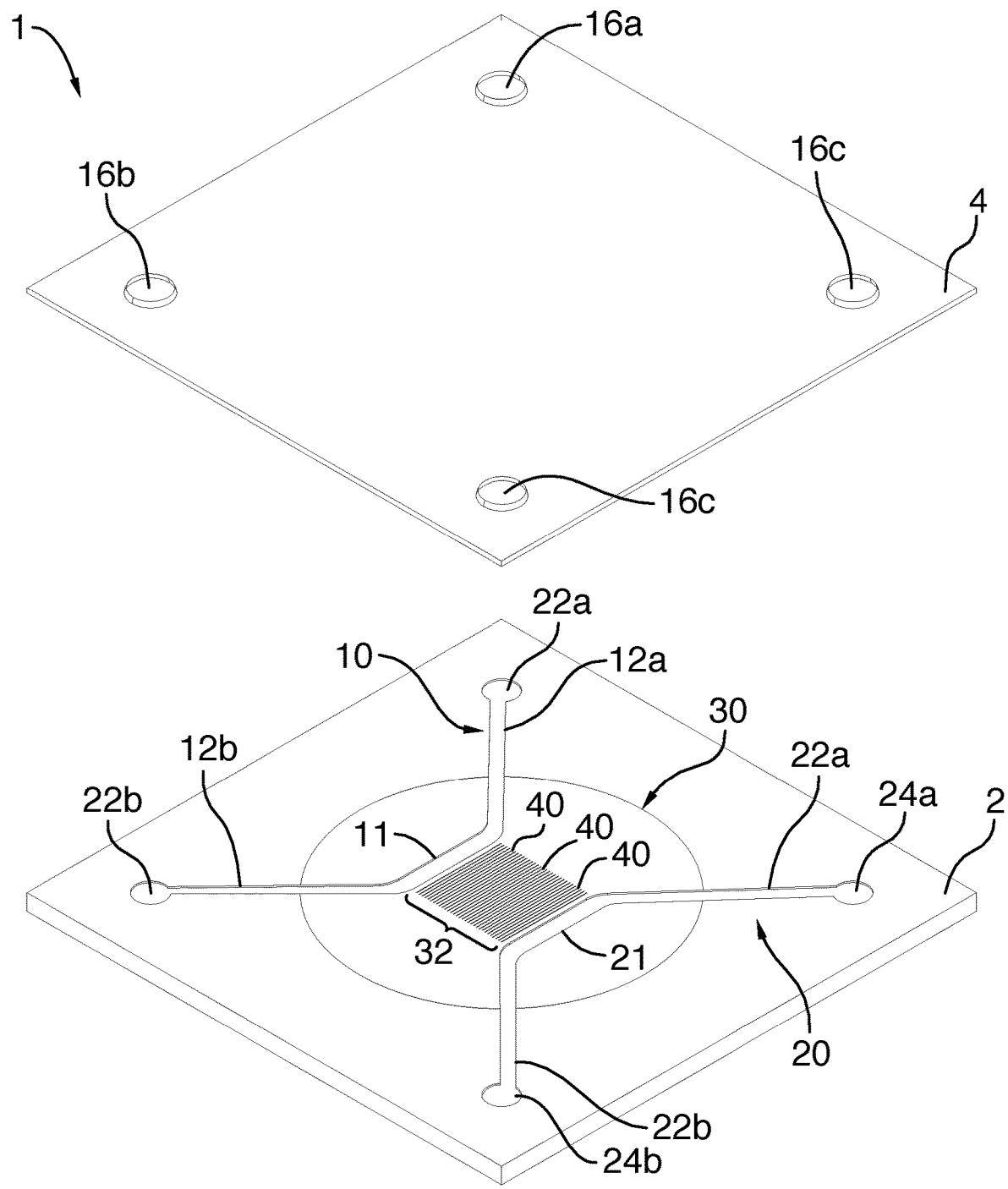
FIG. 1 is a top side perspective view of a nanofluidic flow cell, comprising a nanoconfinement and imaging area with grooves, in accordance with one embodiment.
Figure 22:
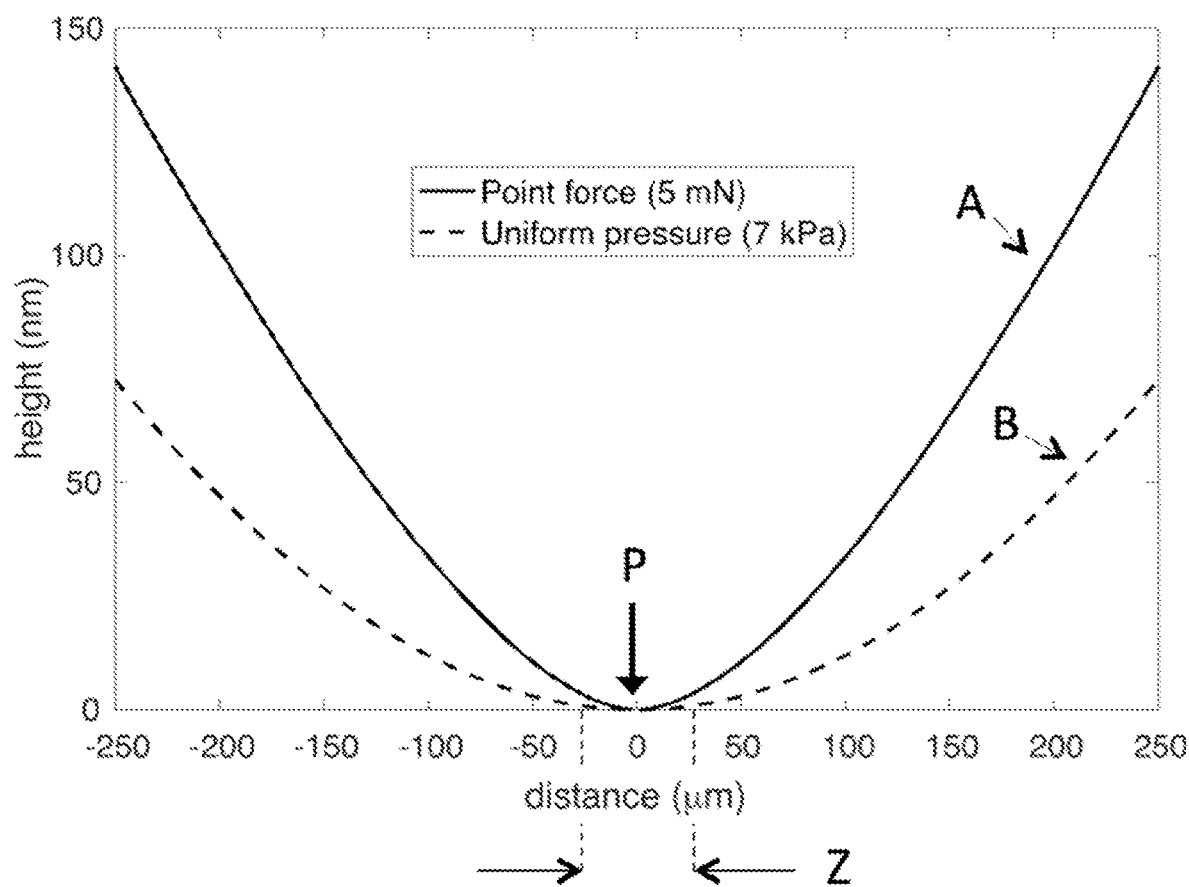

FIG. 22 is a graph illustrating a variation of a height of a distance between two substrates of the flow cell of FIG. 1 in function of a position parallel to the first substrate for an embodiment using a convex lens (line A) and for an embodiment using air pressure (line B).

Further details of the invention and its advantages will be apparent from the detailed description included below.

DETAILED DESCRIPTION OF PREFERRED EMBODIMENTS

In the following description of the embodiments, references to the accompanying drawings are by way of illustration of an example by which the invention may be practiced. It will be understood that other embodiments may be made without departing from the scope of the invention disclosed.

General Overview

The invention provides nanofluidic flow cells and nanofluidic systems for nanoconfinement and single-molecule imaging of molecules in a fluid.

According to the general principles of the present invention, molecules are confined between two substrates and the distance between the two substrates is reduced gradually, thereby reducing a gap between the two substrates which results in gradual entrapment of molecules. Nanostructures are carved into the substrate(s) for nanoconfinement at the molecular stage (e.g. single-molecule). The molecules which are confined can then be imaged individually with a microscope.

Gradual reduction of the distance between the two substrates can be achieved because at least one of the top or bottom substrate is flexible and adapted for being deflected. In embodiments, air pressure and air suction is applied on an outside surface of the flexible substrate to trap and release molecules, respectively.

Miniaturized Nanofluidic Flow Cell

Figure 2A:
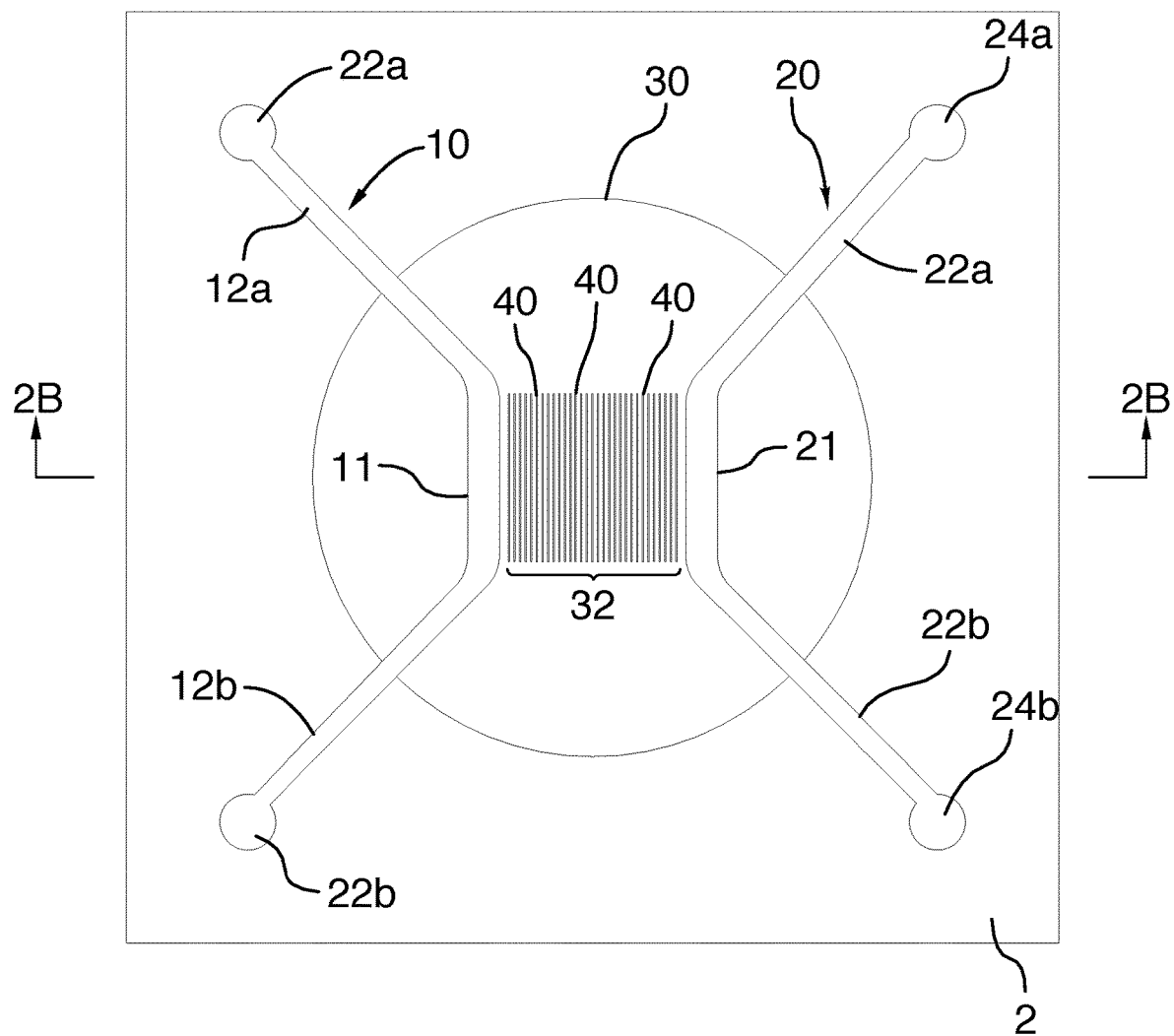
FIG. 2A is a top view of a bottom substrate of the nanofluidic flow cell of FIG. 1.
Figure 2B:
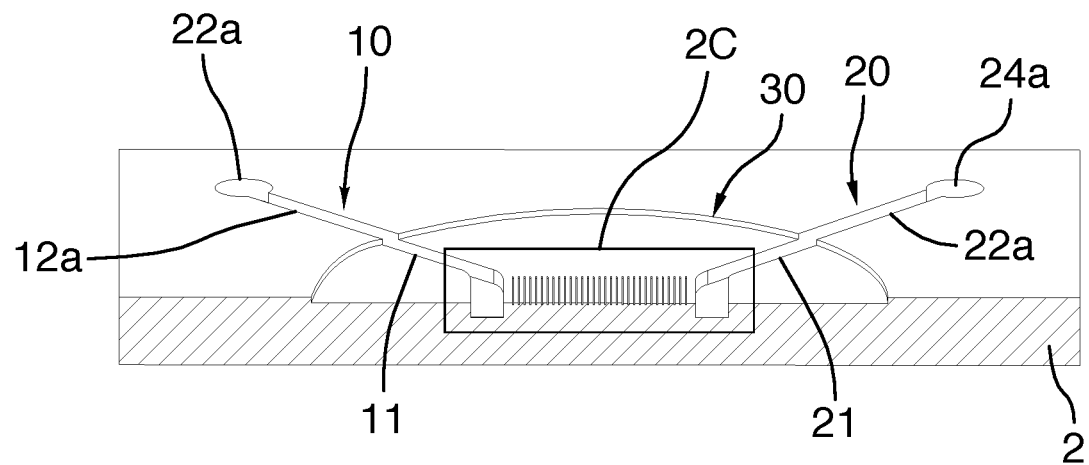
FIG. 2B is a top perspective cross-sectional view of the bottom substrate taken along the line 2B-2B of FIG. 2A.
Figure 2C:
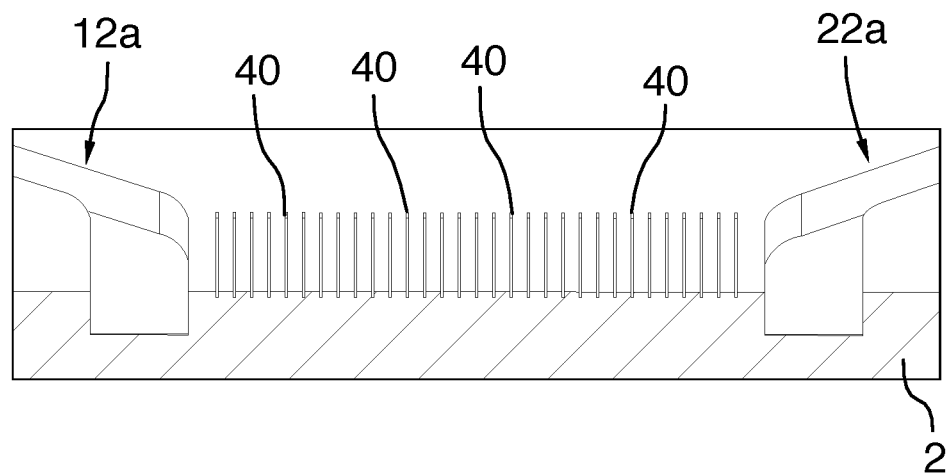
FIG. 2C is an enlarged view of the nanoconfinement and imaging area of the box shown in FIG. 2B.
Figure 3A:
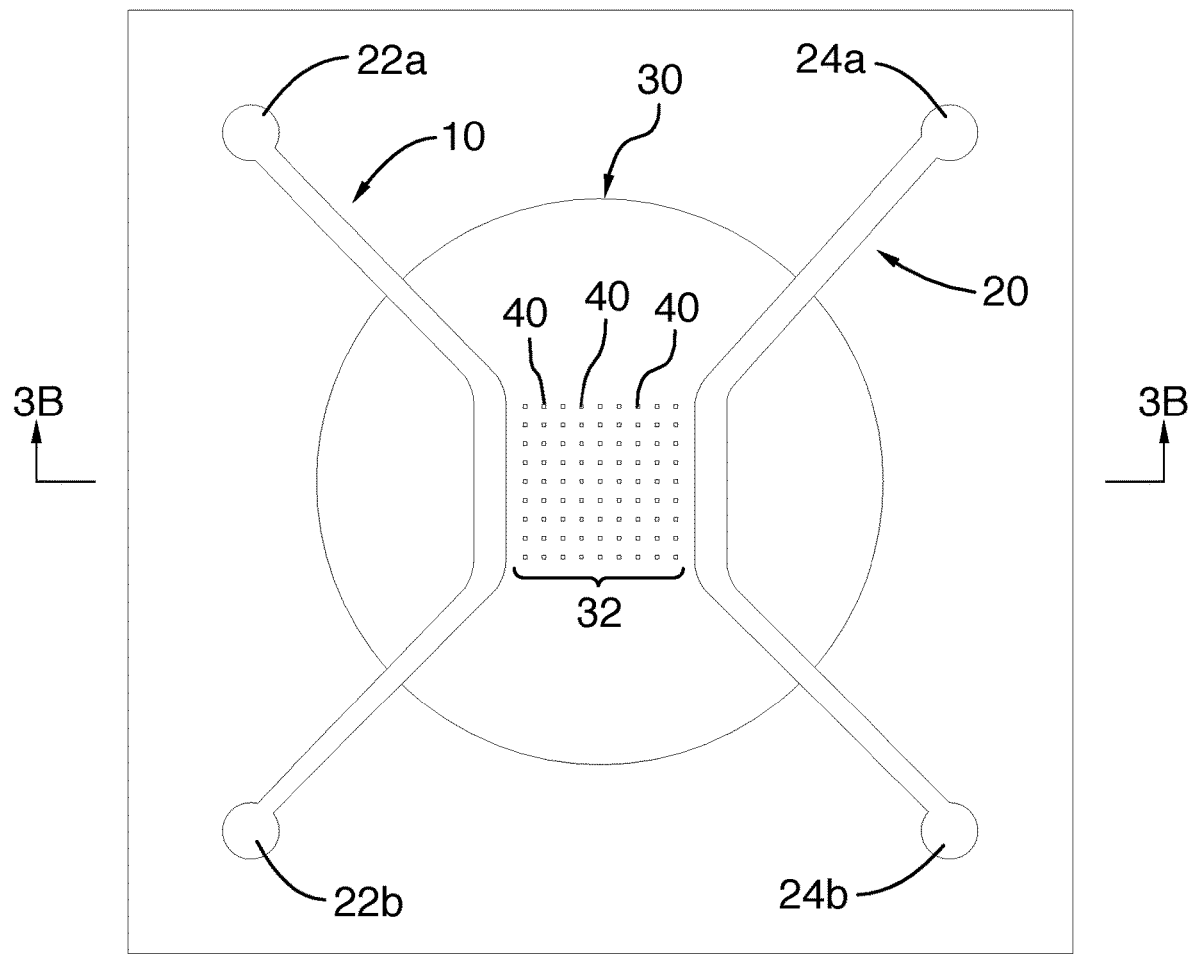
FIG. 3A is a top view of a bottom substrate a nanofluidic flow cell, comprising a nanoconfinement and imaging area with pits, in accordance with another embodiment.
Figure 3B:
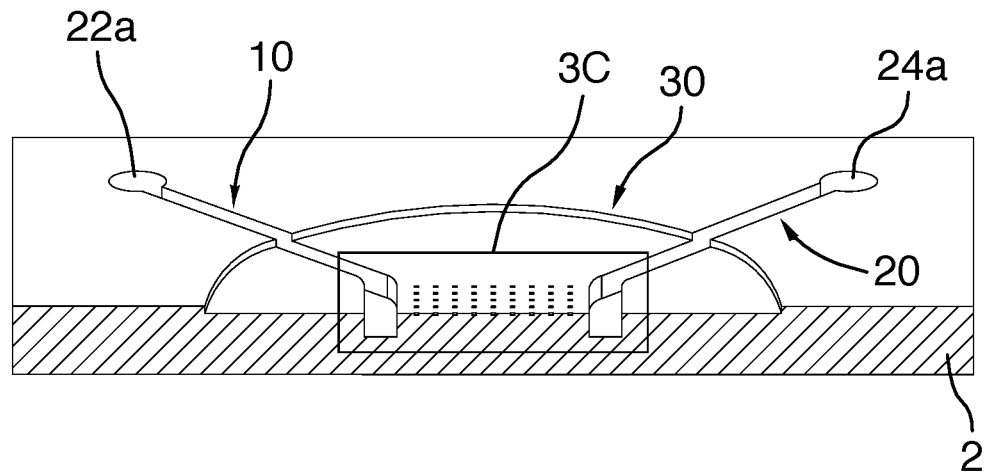
FIG. 3B is a top perspective cross-sectional view of the bottom substrate taken along the line 3B-3B of FIG. 3A.
Figure 3C:
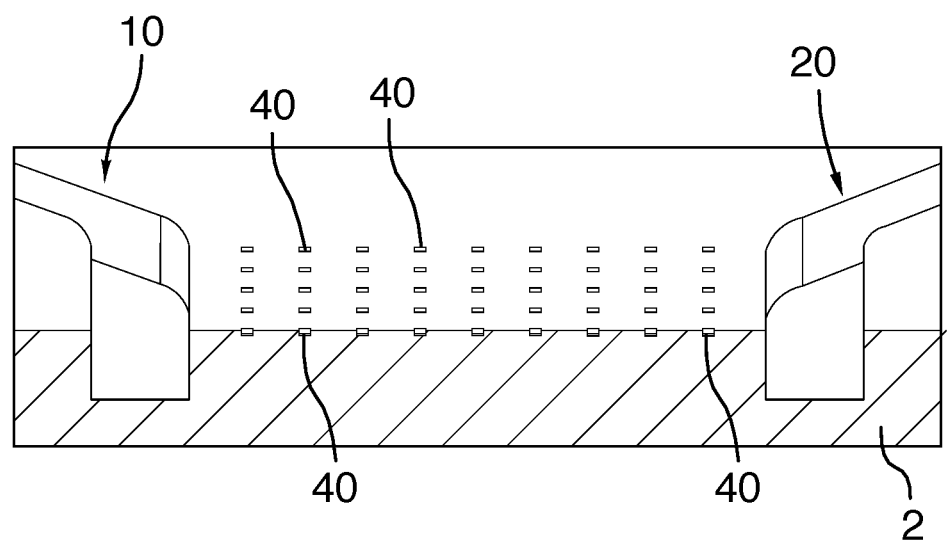
FIG. 3C is an enlarged view of the nanoconfinement and imaging area of the box shown in FIG. 3B.

Referring to FIGS. 1 to 3, there is shown a miniaturized nanofluidic flow cell 1 in accordance with embodiments of the invention.

In the embodiments shown, the nanofluidic flow cell 1 comprises a bottom substrate 2 and a top substrate 4, the bottom and top substrate being bonded together.

At least two spaced-apart microchannels 10, 20 and a central chamber 30 are carved in the bottom substrate 2, the microchannels and the central chamber defining an empty space into which a fluid can flow.

As used herein "carved" or "carving" encompass any method or technique allowing to "draw" or "create" desirable structures, channels, patterns, etc. at the surface of the substrate(s). Although the present examples demonstrates "carving" by removal of material from the surface of the substrate, those skilled in the area appreciate that it may be envisioned to "draw" or "create" desirable nanostructures by "addition" of materials (e.g. 3D-printing, nanopatterning, etc.). Accordingly, the terms "carved" or "carving" as used herein also encompass additive modifications and additive technologies. In embodiments these terms refer particularly to removal of materials from the surface of the substrate(s). This includes, but is not limited to, photolithography, electron-beam lithography, laser lithography, nanoimprint lithography, and interference lithography. Carving may further include chemical etching and/or reactive ion etching to ensure a smoother surface and/or more definite carvings or patterns. In embodiments, manufacture of nanofluidic cells according to the invention comprises carving glass with a combination of methods, depending on the feature size. For instance, for the creation of nanopits in the embodiment illustrated in FIGS. 3A, 3B and 3C (with widths greater than one micron), UV lithography is used to pattern the pits followed by reactive ion etching. For carving the shown nanochannels in the embodiment illustrated in FIGS. 2A, 2B and 2C (with tens of nanometers dimensions) electron beam lithography is used followed by reactive ion etching.

In the embodiment shown FIGS. 1-3, the two microchannels 10, 20 extend on opposite side of the central chamber 30, each of microchannel comprising a central portion 11, 21, crossing the central chamber 30 and a pair of arms 12a, 12b, 22a, 22b, extending outside the central chamber. Each arm comprises a fluid port 14a, 14b, 24a, 24b, positioned at opposite ends of the microchannels and outside the central chamber and the top substrate 4 comprises bores 16a, 16b, 16c, 16d that align with corresponding fluid ports (i.e. 14a, 14b, 24a, 24b, respectively). As explained hereinafter, the two microchannels 10, 20 are configured for introducing two separate fluids which can mix in the central chamber 30.

Figure 5:
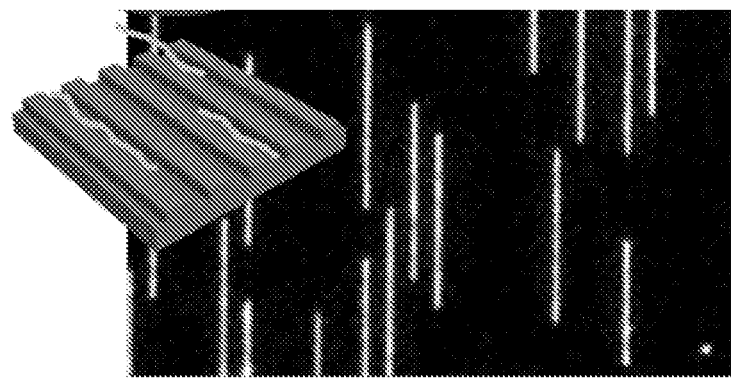
FIGS. 5A-5C are a series panels comprising schematic representations and associated pictures taken with a microscope, these panels depicting single-molecule nanoconfinement and imaging using a nanofluidic flow cell comprising carved linear grooves (A), carved circular grooves (B) and carved pits (C).
Figure 5:
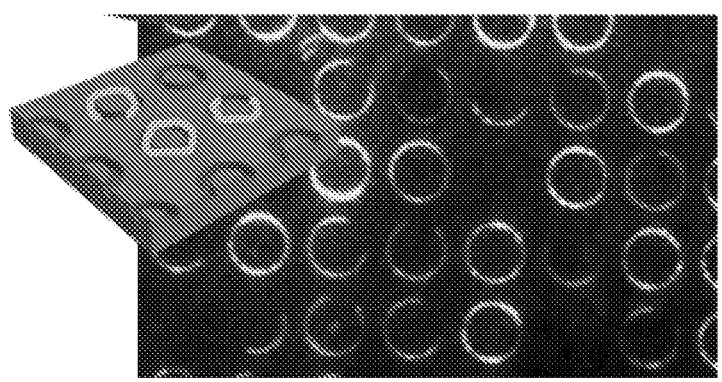
Figure 5:
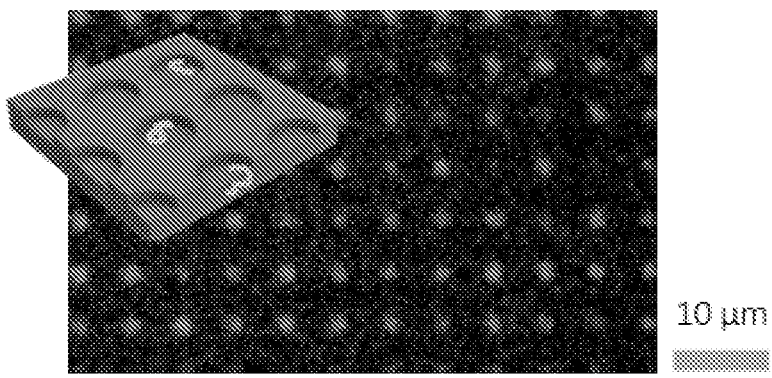
Figure 6:
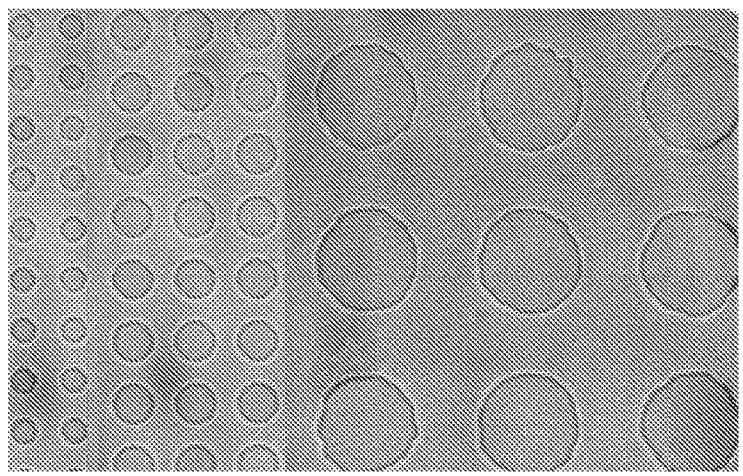
FIG. 6 is a picture taken with a microscope showing examples of carved pits of different sizes having a diameter of about 2 μm to about 10 μm.

Also in the embodiments shown, the central chamber comprises a nanoconfinement and imaging area 32. That area comprises a plurality of carved nanostructures 40 configured for single-molecule nanoconfinement and imaging. The carved nanostructures may be of different shapes including, but not limited to, linear grooves (FIGS. 1, 2 and 5A), concentric circular grooves, ring-shaped grooves (FIG. 5A), nanopits (FIG. 3; FIG. 5C, FIG. 6), custom shape(s), combinations thereof, etc. The carved nanostructures may also have different sizes as shown in FIG. 6. The carved nanostructures may also have different orientation with respect to the flow in the microchannels (e.g. parallel, perpendicular, oblique, etc.) as different orientations may find different purposes (e.g. grooves perpendicular to the flow may prevent drifting of molecules).

In a particular embodiment, the nanostructures are used to trap and linearize long, fully extended DNA molecules for genome mapping by microscopy. The nanostructures can also be used to visualize and manipulate the interactions between the entrapped DNA and/or protein and/or enzyme molecules and/or others, with applications to therapeutics (such as CRISPR therapeutics) and gene editing biotechnologies. In another particular embodiment, nanopits are used to trap molecules and small matter such as nanoparticles, nucleic acids (such as DNA, RNA), drug molecules (such as antisense oligo nucleotides, ASOs), proteins, antibodies, enzymes. The molecules or species are entrapped in the pits where they can diffuse and interact, and their individual time courses observed and characterized. Because the entrapment is based on the molecules' size and shape, a nanoscale gap can be introduced above the open-face nanopits (by a small deflection of the top substrate), allowing for reagents (such as small molecules, solutions, buffers) to be exchanged over the nanopits. This allows for the response of the entrapped molecules to be observed and controlled, with single-molecule quality data and over a broad range of imaging parameters (concentrations, timescales, confinement and solution conditions).

According to the principles of the present invention, at least one of the bottom and top substrate is flexible and adapted for being deflected, at least over the central chamber. As use herein "deflected", "deflection", "deflect", "curving" or similar terms refers to a modification of the shape of the bottom or top substrate, said deflection closing a gap between the bottom and top substrate to confine molecules into the nanoconfinement area (e.g. nanostructures).

Figure 4:
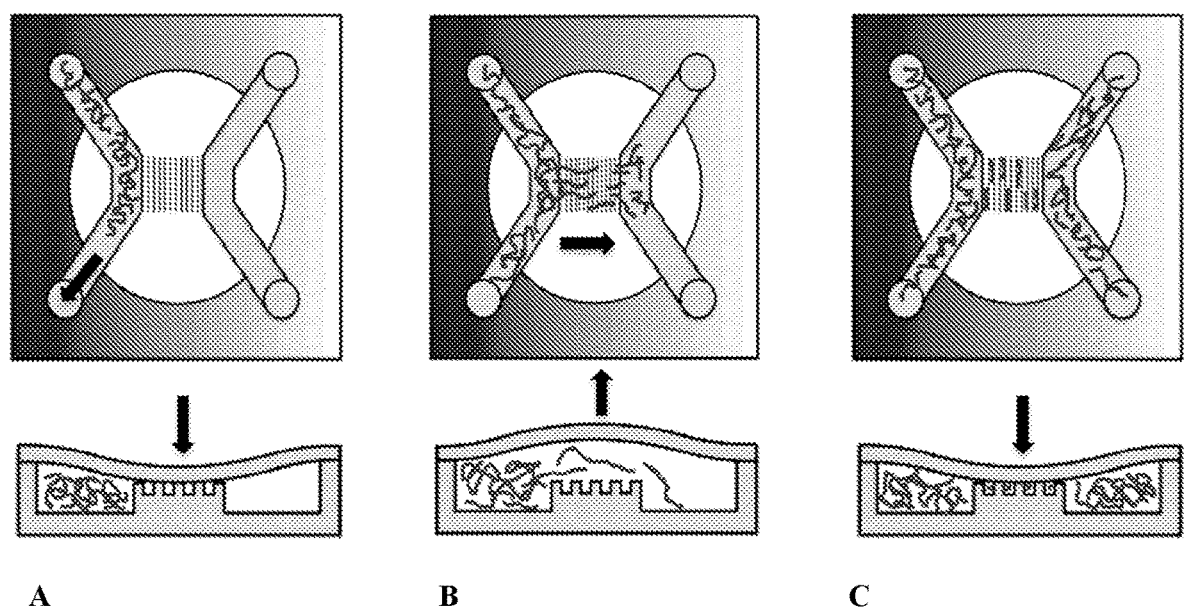
FIGS. 4A-4C are a series of panels comprising top views (upper panels) and cross-sectional views (bottom panels) for illustrating consecutive steps of confinement of molecules into the nanofluidic flow cell, in accordance with one embodiment of the invention.

According also to the principles of the present invention, at least one of the bottom and top substrate is carved for defining its various components (e.g. microchannel, central chamber, nanostructures, etc.). In the embodiments illustrated in FIGS. 1 to 3, the bottom substrate 2 is thicker than the top substrate 4. Accordingly the carvings have been designed into the bottom substrate 2 while the top substrate 4 is thinner and thus more flexible. In the illustrated embodiments, and as depicted in FIG. 4, the top substrate 4 is flexible and adapted for being deflected at least over the central chamber 30. As also illustrated in FIG. 4 and explained hereinafter, the top substrate 40 may be made of a particular material, and/or may configured, for being deflected pneumatically.

Yet, in accordance with the principles of the present invention, particularly in accordance with preferred embodiments, at least one of the top substrate and bottom substrate is manufactured of a material allowing transmission of light, at least inside the central chamber, for imaging of the molecules confined into the nanostructures. The material may be selected in accordance with the desired use and imaging apparatus, for instance a material allowing imaging with a dark-field microscope, a phase-contrast microscope, a differential-interference-contrast microscope, a ultraviolet microscope, fluorescence microscope, and/or a confocal microscope. Suitable materials may include any material allowing such imaging, but is not limited to, glass, hard polymers, silicon, thin metal coatings, silicon nitride, and silicon oxynitride membranes. Suitable materials may have one or more of the following properties: hard, can be carved features inside, can bend, is smooth, has low enough background in the channel/wavelength of interest for imaging, can be fully or partially transparent.

However the present invention is not limited to transparent materials or materials allowing imaging because it may be envisioned to use the present flow cell for other purposes than imaging and/or for imaging at a later stage. For instance one could use the nanofluidic flow cell of the invention to isolate and deposit molecules, and to image the isolated molecules at a later stage. One could remove the top substrate and transfer the molecules confined into the bottom substrate onto another surface for imaging, or for analysis (e.g. sequencing), for example.

In embodiments the bottom substrate and top substrate are fusion-bonded. In embodiments, the top substrate and bottom substrates are made of glass such that the flow cell is fabricated entirely of glass. In embodiments, the top substrate and bottom substrate are anodic bonded with an amorphous silicon or metal intermediate thin film.

The top and bottom substrates may also be treated chemically or biologically prior to assembly so that molecules interact differently with each one the substrate or with different regions thereof. A different interaction may allow for molecules to be selectively captured in different regions of the chamber for example. Treatments can be used to prevent certain interactions for example. Examples of biological and chemical treatments include, but are not limited to, coatings of molecules (such as streptavidin, biotin, other linker molecules and attachments) or polymers such as polyethylene glycol (PEG), polyvinyl pyrrolidone (PVP) or silanes (amino silanes and others). Alternatively, the whole interior of the flow cell can be treated prior to loading the sample (e.g. by flowing in PVP or PLL-PEG in solution, to suppress non-specific adsorption of the sample to the flow cell surfaces).

Those skilled in the art will appreciate that the nanofluidic flow cell of the invention is not limited to a particular size and that dimensions of the flow cell and its components (e.g. microchannels, central chamber, nanostructures, etc.) can be varied in accordance with particular needs (e.g. cost of materials, manufacturing processes, volume of samples to be loaded, etc.). Accordingly, as used herein the terms "microchannel" and "nanostructure" are not limiting to a particular size as these terms are meant to encompass micro, nano and conceivably even smaller dimensions.

For instance, in embodiments the flow cell is about 3 mm×3 mm, or about 5 mm×3 mm, or about 5 mm×5 mm. According to such embodiments, the bottom substrate may have a thickness of about 50 to about 2 mm, (e.g. about 50 µm, or about 75 µm, or about 100 µm, about or 125 µm, or about 140 µm, or about 170 µm, or about 200 µm, or about 250 µm, or about 500 µm, or about 750 µm, or about 1 mm, or about 1.5 mm, or about 150 µm to about 250 µm) and the top substrate may have a thickness of about 30 µm to about 150 µm (e.g. about 30 µm, or about 50 µm, or about 110 µm, or about 150 µm).

In an embodiment where the flow cell is about 5 mm×3 mm, the central chamber may have a diameter of about 2 mm and a depth of about 500 nm (e.g. to match the focal depth of the imaging system), the nanoconfinement and imaging area may be of about 1 mm×1 mm with a depth of about 250 micron or less, and the microchannels may have a total length of about 7.5 mm (each arm having a length of about 3.75 mm). In embodiments, the microchannels have a width of about 100 to about 200 µm and a depth of about 1 µm to about 20 µm (e.g. 1 µm, 5 µm, 10 µm, 15 µm, 20 µm). In embodiments, the grooves inside the nanoconfinement and imaging area have a width of about 40 nm and a depth of about 40 nm. In embodiments, the pits, the nanoconfinement and imaging area has a width of about 1 micron to about 5 micron (e.g. 1, 2, 3, 4, 5 micron) and they have a depth of about 300 nm to about 450 nm.

In embodiments, the nanofluidic flow cell in accordance with the present invention comprises ultralow volume (e.g. less than 10 µl, or less than 1 µl, or less than 100 nl, or less than 10 nl or less than 1 nl). In embodiments, the nanofluidic flow cell comprises an internal volume of about 10 µl to about 100 nl, or about 5 µl to about 50 nl, or about 1 µl to about 1 nl. Accordingly, the term "microfluidic" and "nanofluidic" may be used interchangeably as the present invention is not limited to a particular volume of fluid.

Figure 8:
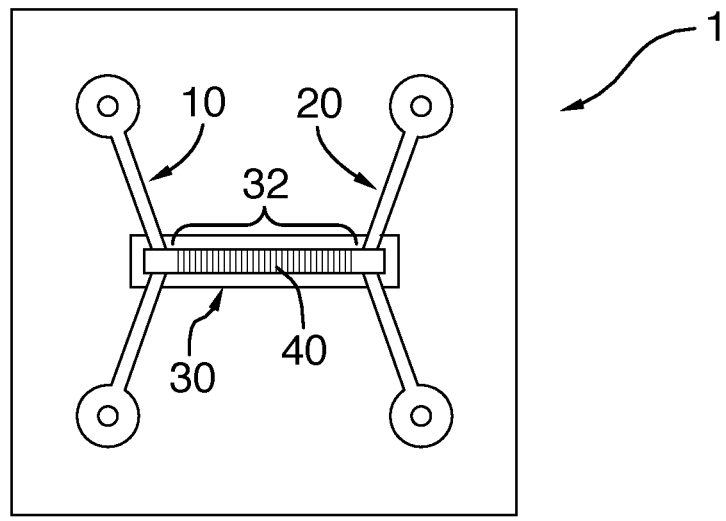
FIG. 8 is a schematic representation of a nanofluidic flow cell comprising a longitudinal central chamber and four (4) microchannels, in accordance with another embodiment of the invention.

In the illustrated embodiment, the two microchannels 10, 20, each have a C-shape and the microchannels define with the central chamber 30 a X-like shape. However, the two microchannels 10, 20 may have different shapes with individual arms, having identical or different configurations (straight, curved, S-shape, Y-shape, etc.). Also, as illustrated in FIG. 8 showing a nanofluidic flow cell comprising four (4) microchannels 10, 10a, 10b, 20, the flow cell of the present invention may comprise more than two microchannels (e.g. 3, 4, 5, 6, 7, 8, etc.) depending on a user needs. It may also be conceivable to have a single microchannel crossing the central chamber or to have one or more microchannel having one single arm extending outside the central chamber.

Figure 9:
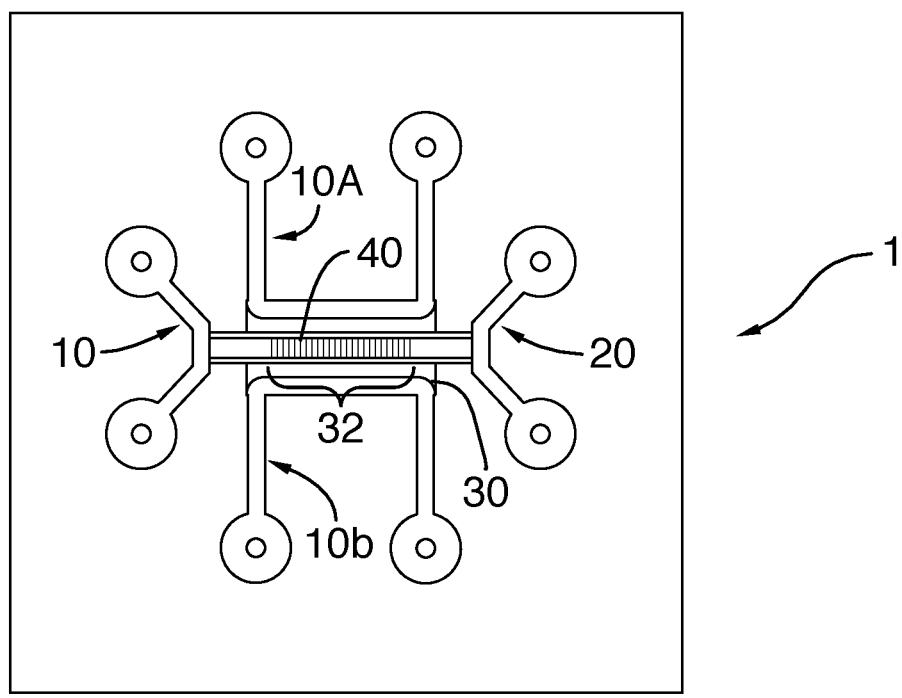
FIG. 9 is a schematic representation of a nanofluidic flow cell comprising a longitudinal central chamber and four microchannels (height (8) arms), in accordance with another embodiment of the invention.

In the embodiments illustrated at FIGS. 1 to 3, the central chamber 30 has a circular shape. The invention is not limited to circular and it encompasses embodiments of a central chamber having additional shapes such as square, rectangular, octagonal, elliptical, and others, including combinations of carved regions. For instance, FIGS. 8 and 9 illustrate designs of nanofluidic flow cells with a central chamber 30 having a rectangular shape.

According to an additional embodiment, nanoslits can be formed with a fixed height over a large area by providing stand-off posts which extrude from one of the surfaces. For instance, post stand-offs may be provided to one of the flow-cell surfaces so that a stable nanoslit of fixed height, over a large area, is formed when the top and bottom surfaces come together. This facilitates reagents (such as buffers of different salinity or pH, or solutions containing small molecules such as drugs) to be perused over the entrapped macromolecules, which are confined entropically in nanostructures (such as pits or grooves). Such confinement may be particularly useful for visualizing interactions (e.g. binding, unbinding) between molecules within the nanostructures, and in particular, in response to the introduction of the perfusion of reagents over those nanostructures, which can modulate the interactions. The kinetic rates of unbinding/binding, the diffusion coefficients and sizes of the molecules (or clusters/aggregates of molecules), as well as other properties, can be measured, in real time, as a function of the reagent exchange. By imaging many nanostructures at once, the distribution of heterogeneous properties of the molecules (such as the fraction which have clustered into aggregates, and the number of molecules per cluster) can be characterized, revealing critical information for drug developability—information which can only be accessed under single-molecule conditions.

One example is the exchange of drug molecules within a flow cell, where the drug mediates the interactions between proteins and antibodies. In the field of biologics, the developability of drugs is often limited by not understanding how drugs influence interacting proteins and antibodies, as opposed to aggregates of these molecules. Data acquired under single-molecule conditions allows for the response of normal copy numbers of interacting molecules, vs. aggregates of molecules, to be distinguished and understood. Another example is oligonucleotide based therapeutics (ASOs, CRISPR therapeutics, RNAi based therapeutics) where the ability to visualize interactions in the presence of different reagents, which are perfused in serially (one by one), is critical to deconstructing and understanding multi-step molecular interactions which depend on multiple species (e.g. co-operative interactions). These same advantages apply to other applications, such as the development of nanoparticle carriers for small molecules, and their dissolution and formation dynamics.

Sheet

Figure 10:
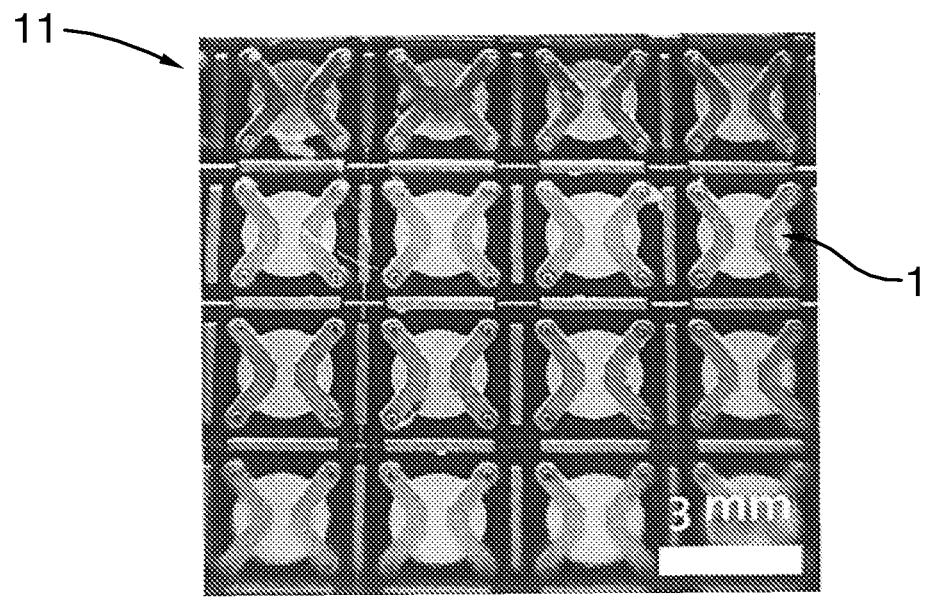
FIG. 10 is a picture of a sheet comprising a plurality nanofluidic flow cells in accordance with FIG. 1.

In accordance with a related aspect, the invention relates to a sheet comprising a plurality of nanofluidic flow cells as defined herein. For instance, FIG. 10 illustrates a sheet 11 comprising sixteen (16) flow cells 1 that are joined together. Accordingly the present invention encompasses such sheets were individual "smaller" flow cells can be manufactured from "larger" top and bottom substrate, the top and bottom substrate being carved, etched, perforated, etc. and then bonded together. In one embodiment, the sheet is adapted for cutting into multiple pieces such that each piece provides an individual flow cell. In the alternative, it is conceivable to use a sheet comprising a plurality of individual flow cells for imaging multiple flow cells simultaneously or consecutively.

Imaging Chip

Figure 11:
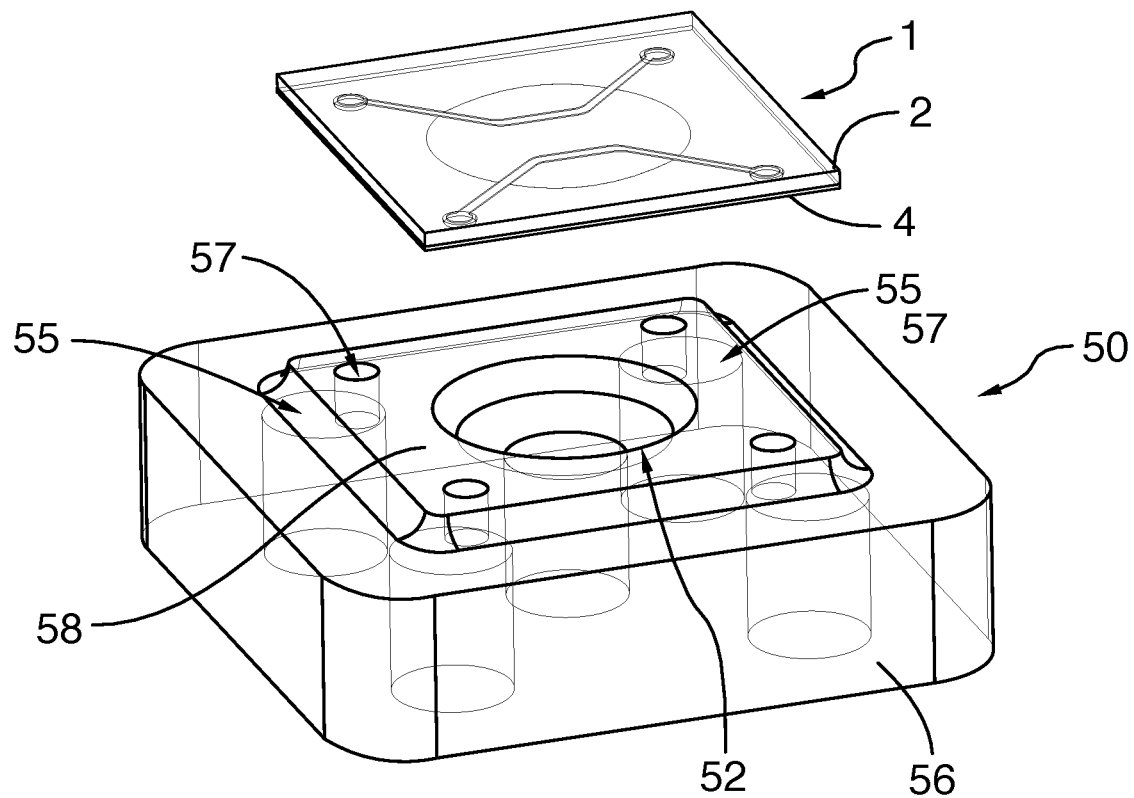
FIG. 11 is a top perspective transparent view of a flow cell chip comprising the nanofluidic flow cell of FIG. 1.

A related aspect of the invention relates to an imaging chip for single-molecule nanoconfinement and imaging of molecules in a fluid. Referring to FIG. 11, in one embodiment the imaging chip 50 comprises a carrier substrate 56 onto which is bonded a nanofluidic flow cell 1 as defined herein. In the illustrated embodiment the carrier substrate comprises a flat surface 58 onto which the flow cell can be bound (e.g. glued or the like). The carrier substrate further comprises at least four (4) reservoirs 55, each reservoir having an inlet 57 that traverses the bores 16a, 16b, 16c 16d of the top substrate 4 and fluidly connect to corresponding fluid ports 22a, 22b, 24a, 24b of the nanofluidic flow cell 1. The carrier substrate 56 also comprises a funnel-shaped central bore 52 defining a void over the central chamber 30 of the flow cell 1.

The carrier substrate 56 can be made of any suitable material including, but not limited to plastic, metal, glass or polydimethylsiloxane (PDMS). In embodiments, the nanofluidic flow cell may be bonded to the carrier using any suitable means such as with glue, direct fusion, plasma bonding and the like.

Methods and Uses

FIG. 4 provides a schematic example of confinement of molecules (e.g. DNA molecules) into an embodiment of the nanofluidic flow cell according to the invention. In a first step, a liquid sample comprising DNA molecules is loaded into one of the fluid port of the left micro channel (FIG. 4A) while air pressure is being applied on the flexible top substrate. This air pressure closes a gap between the top substrate and the central chamber's nanoconfinement and imaging area, thereby preventing said molecules to reach said area. Then the pressure is released and/or air suction is applied over the flexible top substrate, thereby allowing molecules to flow into the nanoconfinement and imaging area to reach the second, right channel (FIG. 4B). Finally, air pressure is applied again over the flexible top substrate to deflect the top substrate. At some point, the deflection is such that a height of the gap is sufficiently small to load and entrap the molecules in the nanostructures of the nanoconfinement and imaging area are (i.e. grooves) (FIG. 4C).

In an alternative embodiment, there might be no gap at all, i.e. the top substrate is permanently in contact with the nanoconfinement and imaging area and a flow of molecules into the nanoconfinement and imaging area is only possible when air suction is applied over the flexible top substrate in order to create a gap (FIG. 4B).

In an additional alternative embodiment, suction may not be necessary and a convex lens may be used for applying pressure on the flexible top substrate, next releasing that pressure for allowing a flow of molecules into the nanoconfinement and imaging area and then applying the pressure again for nanoconfinement and imaging. Alternately, the flexible top substrate may be bent or deflected with a piezoelectric actuator, or by applying an electrostatic force, or by electromagnetic actuation.

Figure 7:
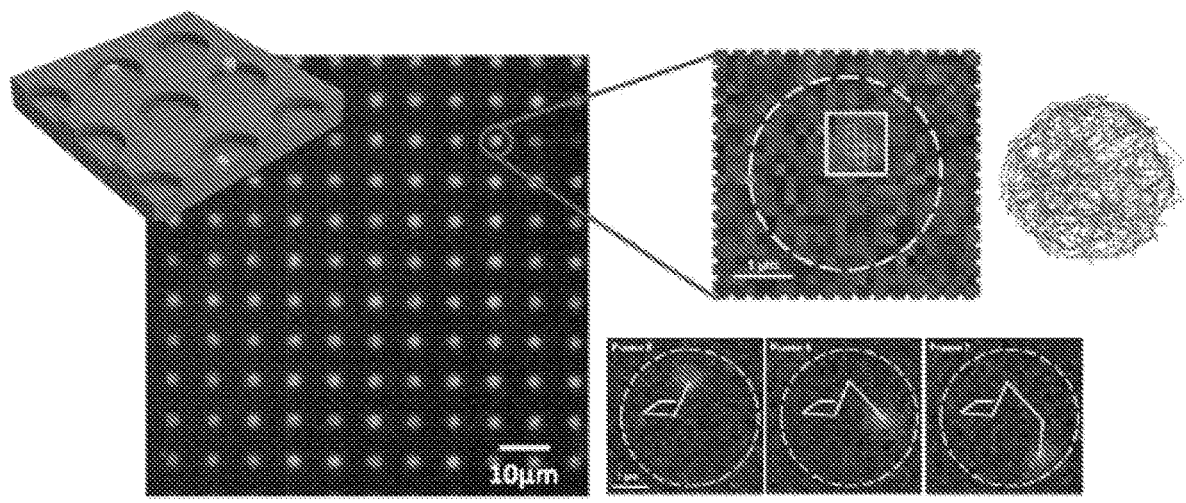
FIG. 7 is a panel with a schematic representation and pictures taken with a microscope, this panel depicting single nanoparticle tracking using a flow cell comprising carved pits, in accordance with one embodiment of the invention.

FIGS. 5A, 5B and 5C provide additional examples of single-molecule nanoconfinement and imaging in accordance with the present invention. As shown, the nanostructures can have various shapes, depending of a desired use. Similarly, as illustrated in FIG. 7, the nanofluidic flow cell of the invention can be used for single nanoparticle tracking.

In the embodiments shown, because the microchannel dimension's is much greater than the dimension of the nanogrooves, and because the hydraulic resistance scales with the cubic power of the dimension of the nanogrooves, molecules may first be trapped in the nanogrooves and subsequently, without being disturbed, be immersed in reagents introduced via the microchannels (the same or a different one).

In a preferred embodiment, air-pressure is used for deflecting the top substrate. Indeed the use of air pressure for the deflection of the top substrate might overcome some of the challenges with prior technology (e.g. confinement gradient, limited size of confinement region, requirement of large devices). By using air-pressure it may be possible to provide a fine tuning of a confinement gradient. In addition, by using air-pressure it may be possible to apply a more uniform force to the external surface of the top substrate which might dramatically reduce the confinement gradient.

Furthermore, as shown in Example 2, the use of air pressure allows applying pressure past initial contact such that an area of uniform contact can be formed. Said area is larger than that what is created with a convex lens. Moreover, the use of suction raises the top surface, making sample introduction easy. This might allow the spacing between the top and bottom confining surfaces to be reduced from >10 µm to <100 nm.

Although, the present description refers extensively to air pressure and flow of air, alternate modes of pressurisation could be envisioned, including with a liquid (e.g. water). Accordingly, the present invention encompasses liquid-based devices and systems for deflecting the nanofluidic flow cell of the invention. Further to this, other methods of deflection are possible beyond using air or liquid pressure, such as methods using electromagnetic fields or magnetic fields to generate deflection forces, and patterned features on the surface which respond to these forces.

Nanofluidic Air-Based System and Method for Nanoconfinement

According to another aspect, the invention relates to a nanofluidic system for single-molecule nanoconfinement and imaging of molecules in a fluid. In embodiments, the nanofluidic system comprises a nanofluidic flow cell as defined herein and a pneumatic system configured for exerting an air pressure and/or an air suction on an external surface said top substrate. As described hereinbefore, an alternate air pressure and air suction provide, respectively, for a confinement and a circulation of molecules into the nanostructures.

In an alternative embodiment, the nanofluidic system comprises a simpler version of a nanofluidic flow cell, for instance a flow cell having a single microchannel reaching the central chamber comprising the nanostructures.

According to a related aspect, the invention concerns a method for nanoconfinement of molecules in a fluid. In one embodiment, the method comprises the steps of:

providing a flow cell comprising of a bottom substrate, a top substrate, a central chamber and at least one microchannel crossing said central chamber, wherein the central chamber and the at least one microchannel are carved in at least one of said bottom and top substrate to define an empty space into which a fluid can flow, wherein at least one of the bottom glass substrate and top glass substrate is flexible and adapted for being deflected pneumatically;

loading a liquid sample comprising molecules into a fluid port positioned at one end of the microchannel while applying air pressure over an external surface of said flexible substrate, said air pressure preventing said liquid sample from entering the central chamber;

releasing said air pressure and/or applying air suction over an external surface of said flexible substrate to increase a gap height between the flexible substrate and the central chamber and allow said liquid sample to flow from the microchannel into the central chamber; and applying air pressure over an external surface of said flexible substrate to close a gap between the flexible glass substrate and the central chamber and confine molecules in said liquid sample in the central chamber.

Preferably, the flow cell used in this system comprises at least two microchannels as described hereinbefore (e.g. FIGS. 1 to 3). When using such a flow cell, the method may further comprises the step of loading two separate fluids in the two microchannels and mixing these fluids in the central chamber when releasing the air pressure.

Preferably, the applying the air pressure and/or applying the air suction comprises using a pneumatic system configured for exerting such air pressure and/or air suction on the external surface of the flexible glass substrate. The pressure and/or suction may be applied using any suitable means, such as by simply using a handheld syringe or a syringe pump. Means allowing a fine control of the deflection are preferable.

Manifold Assembly

According to another aspect, the invention relates to a manifold assembly for a nanofluidic flow cell. As described and illustrated herein, the manifold assembly is devised for loading a nanofluidic flow cell onto an image microscope, while allowing control of a fluid flow inside the microchannel(s) and allowing deflection of the top substrate of the flow cell with air pressure and/or air suction.

In accordance with the embodiment illustrated in FIGS. 12 to 19, the manifold assembly 100 comprises a rigid piece 110 for receiving an imaging chip 50 carrying a nanofluidic flow cell 1. In the illustrated embodiment, the rigid piece 110 is removably connected to and surrounded by a mounting base 90 adapted for being clamped or removably connected to an imaging microscope (see FIG. 20). In the illustrated embodiment, a plurality of screws 94 extend through the rigid piece 110 to reach corresponding bores 92 into the base 90. The base 90 comprises also a central empty space 95 to receive the chip 50 and allow access of a microscope light to the bottom substrate of the flow cell 1 once assembled on a microscope plate (see FIG. 20). The base also comprises side walls with apertures 93 for providing access to connectors 152a, 152b, 154a, 154b and 150.

For receiving the imaging chip 50 and nanofluidic flow cell 1, the rigid piece 110 comprises a central empty space 112 defining an area configured for receiving the imaging chip 50 carrying the nanofluidic flow cell 1, when loaded onto a microscope. Those skilled in the art will understand that the rigid piece 110 is not strictly configured for receiving directly an imaging chip 50 carrying a nanofluidic flow cell 1. Indeed, in the illustrated embodiment, a sealing gasket is positioned between the chip 50 and the rigid piece 110 for providing a sealing connection between the chip 50 and the rigid piece 110. Alternatively, other types of sealing means such as O-rings or the like could be provided. Accordingly, the empty space 95 at the center of the rigid piece 110 is further configured to receive, indirectly, an imaging chip 50 carrying a nanofluidic flow cell 1.

The embodiment of the manifold assembly 100 illustrated in FIGS. 12 to 19 is configured to be used with a nanofluidic flow cell 1 comprising two microchannels and four (4) fluid ports as defined hereinbefore. Accordingly the rigid piece 110 comprises four (4) corresponding bores 111 extending through the rigid piece 110. These bores (see visible bores

Figure 12:
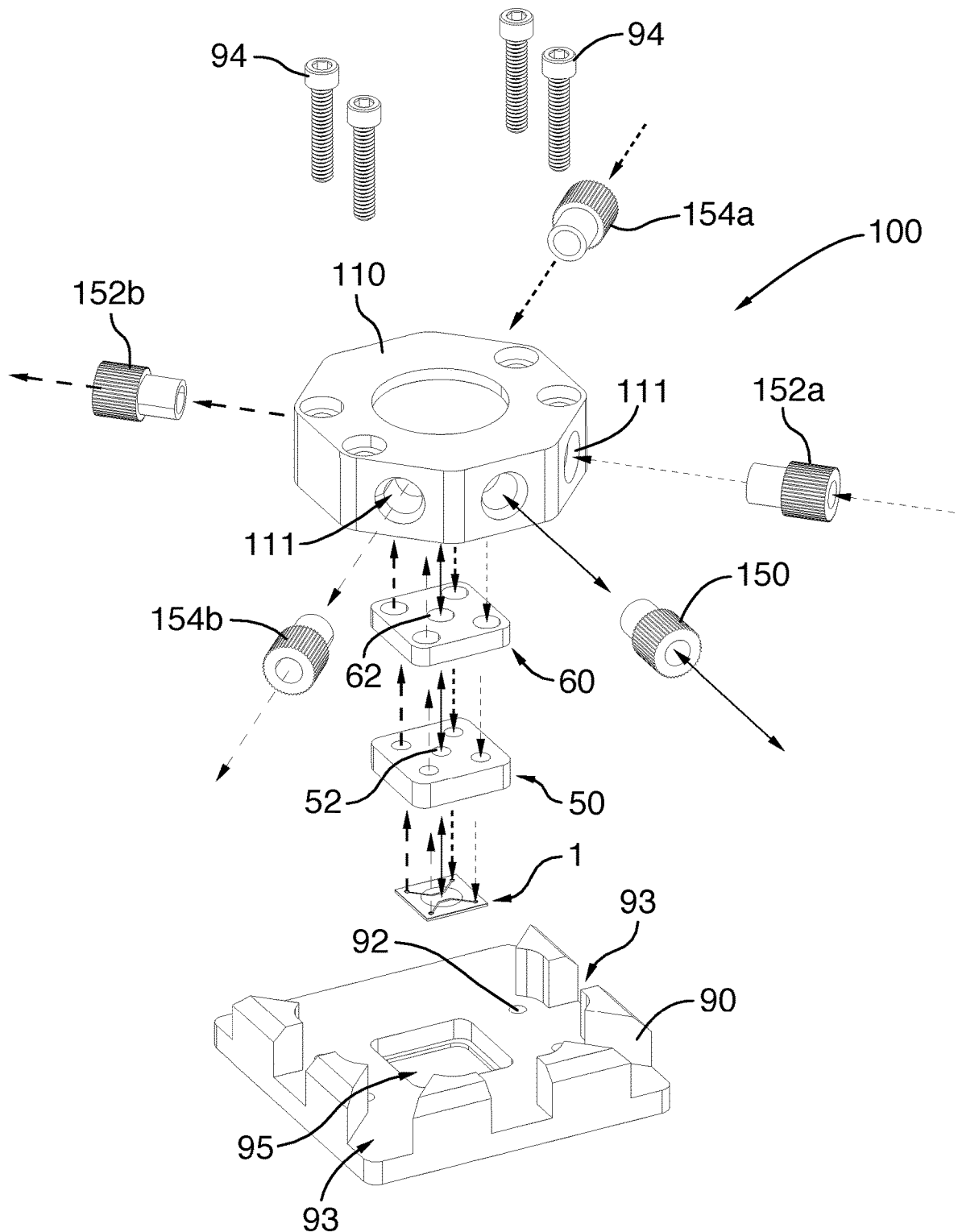
FIG. 12 is an upper front exploded perspective view of a manifold assembly for a nanofluidic flow cell, in accordance with an embodiment.
Figure 13:
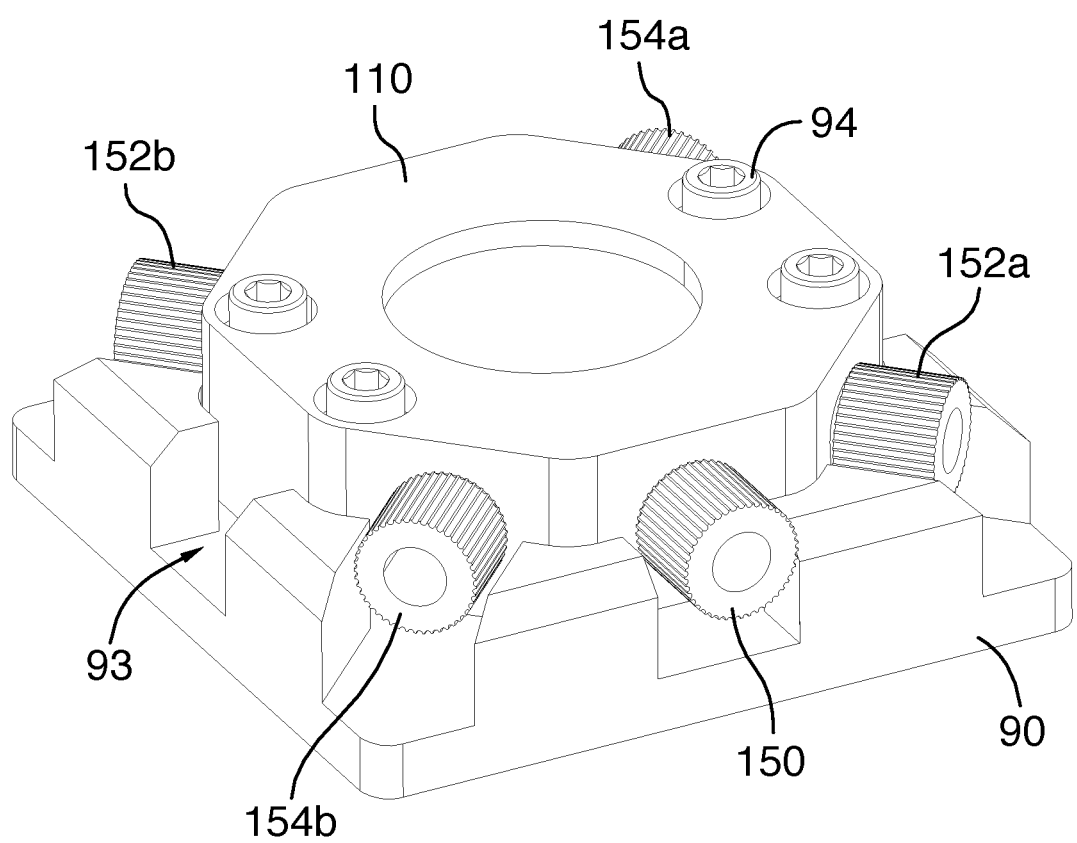
FIG. 13 is a top perspective view of the manifold assembly of FIG. 12, once assembled.
Figure 14:
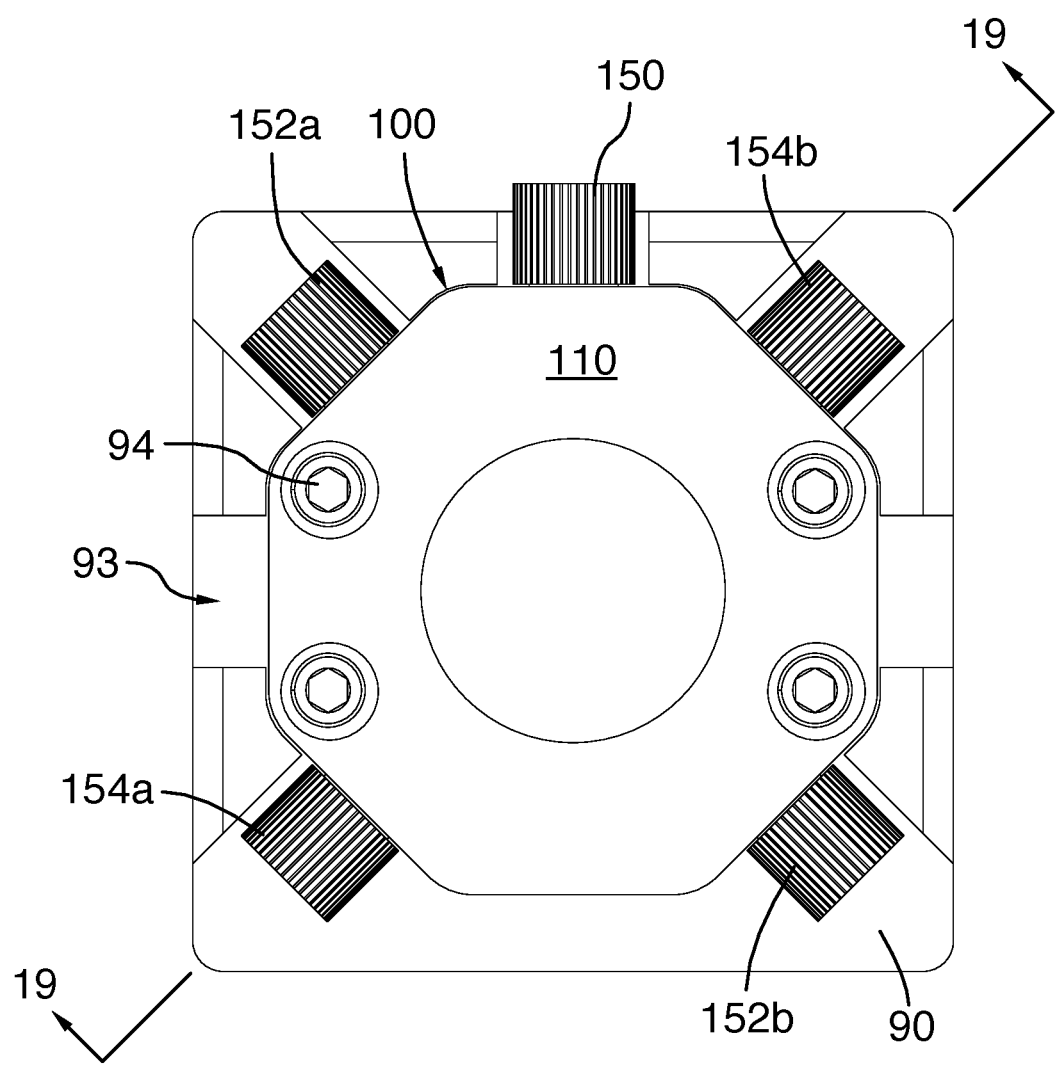
FIG. 14 is a top view of the manifold assembly of FIG. 10.
Figure 15:
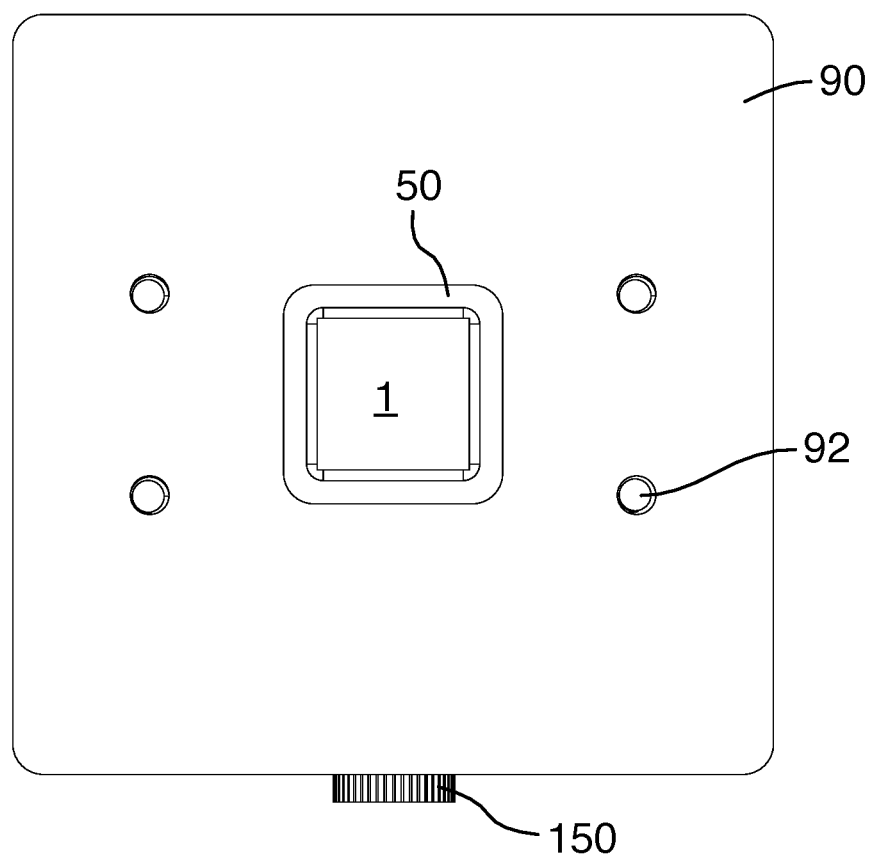
FIG. 15 is a bottom view of the manifold assembly of FIG. 10.
Figure 16:
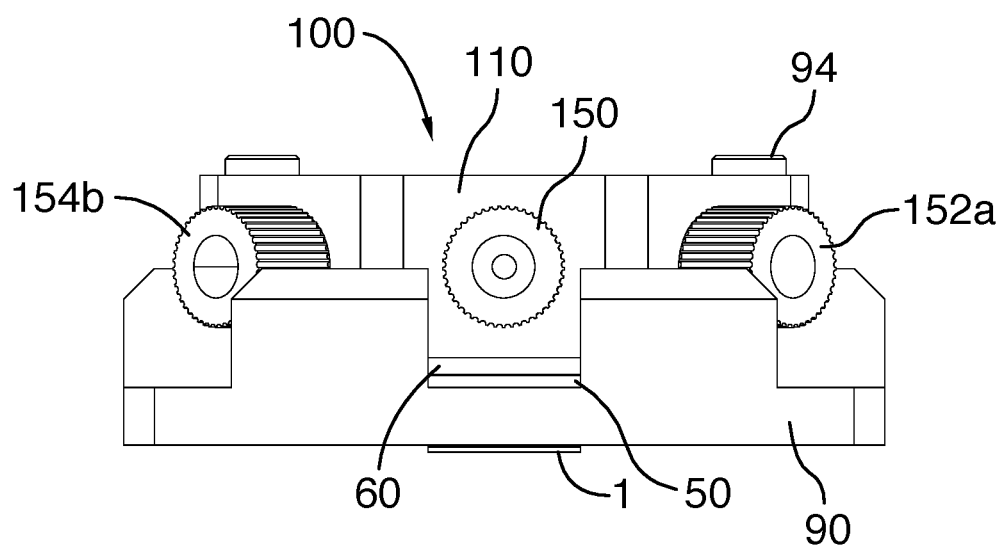
FIG. 16 is a front view of the manifold assembly of FIG. 10.
Figure 17:
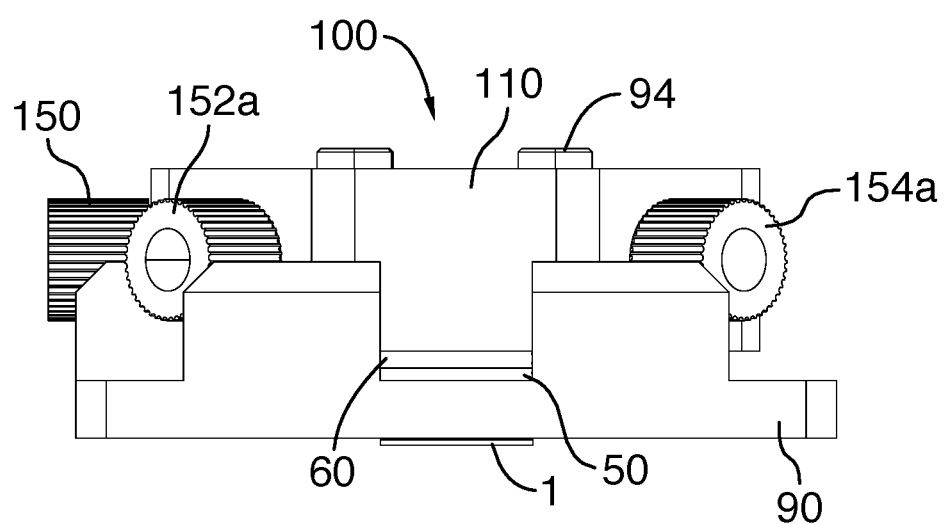
FIG. 17 is a side view of the manifold assembly of FIG. 10.
Figure 18:
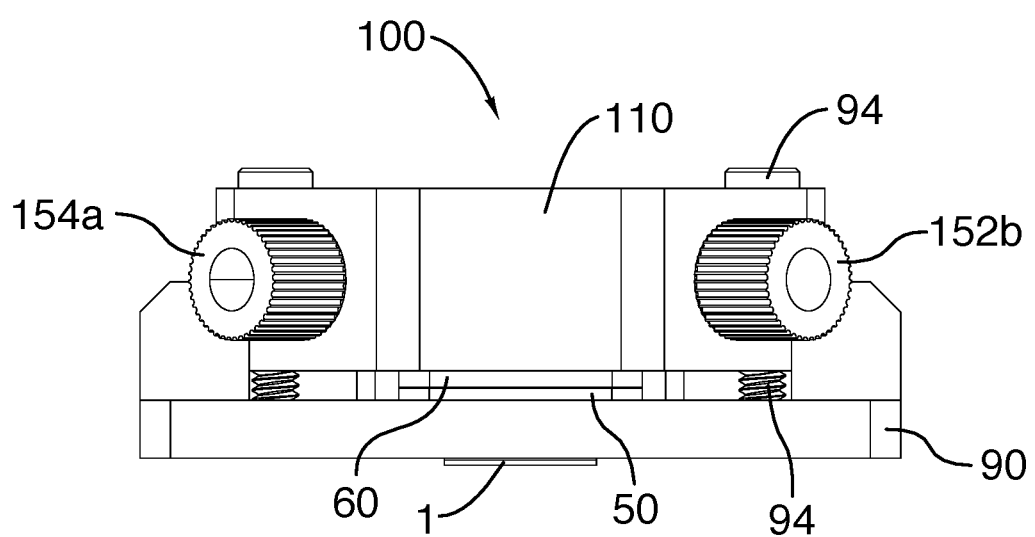
FIG. 18 is a back view of the manifold assembly of FIG. 10.
Figure 19:
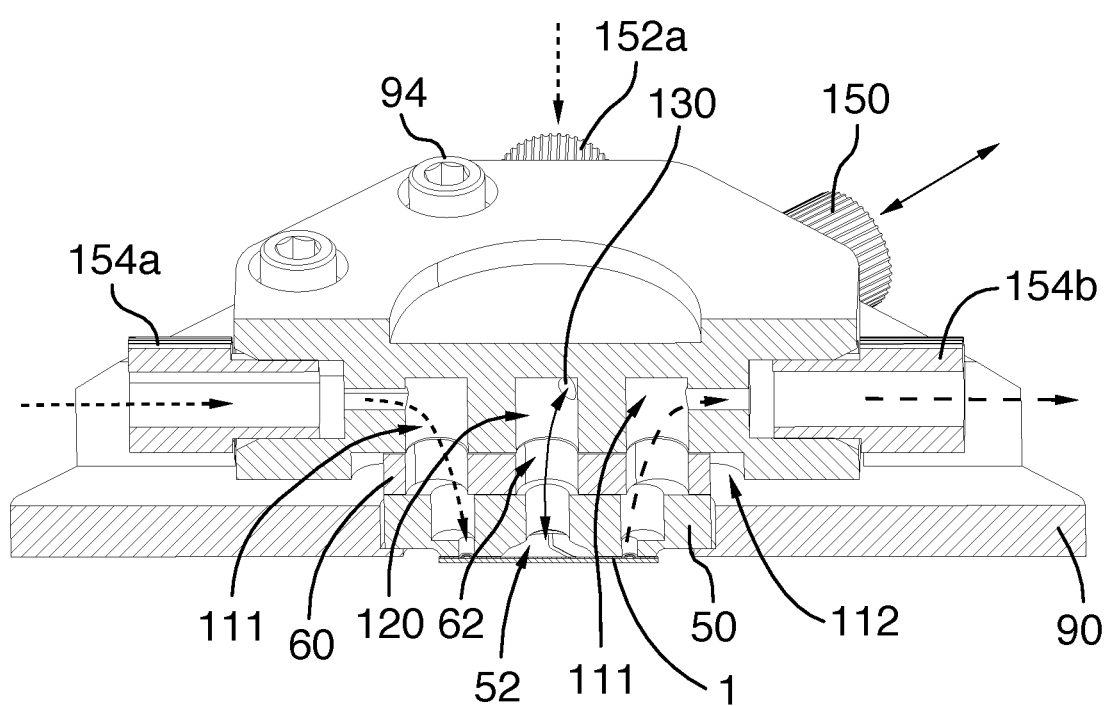
FIG. 19 is a cross-sectional perspective view of the manifold assembly taken along lines 19-19 of FIG. 14.
Figure 20:
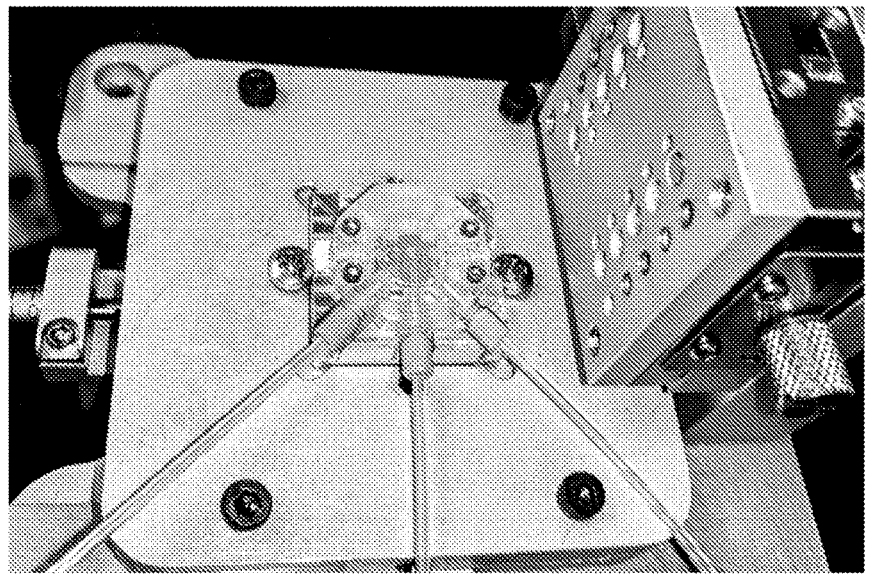
FIG. 20 is a picture showing a top perspective view of the manifold assembly of FIG. 10 mounted onto an imaging microscope.

111 at FIGS. 12 and 19) are positioned and adapted for defining channels providing a fluid connection between the fluid ports of the microchannels and an exterior of the rigid piece (e.g. via optional connectors 152a, 152b, 154a, 154b).

The embodiment of the manifold assembly 100 illustrated in FIGS. 12 to 19 is further configured to deflect a top substrate of a nanofluidic flow cell using air pressure or air suction. Accordingly, as best shown in FIG. 19, the rigid piece 110 further comprises a central bore 120 extending inside the central empty space 112 of the rigid piece 110, the central bore 120 being configured to be positioned over the central bore 52 of the carrier 50 and in air communication thereof. Also, an air channel 130 extends from the central bore 120 to an exterior of the rigid piece 110 (e.g. optional connector 150) for providing a fluid (e.g. air) communication between said exterior and said empty space 112.

FIG. 12 and FIG. 19 illustrate the liquid flow of into the manifold assembly 100 and into flow cell 1. Two different patterns of arrowhead dash lines illustrate the flow of liquid from an exterior of the manifold assembly 100 (e.g. via connectors 152a, 154a) into bores 111, traversing corresponding bores into the sealing gasket 60 and the carrier chip 50 to reach the flow cell 1. After traversing the flow cell 1, the flow may exit the manifold assembly 100 via the bores of the carrier chip 50 and the sealing gasket 60, and traverse bores 111 to reach an exterior of the manifold assembly 100 (e.g. via connectors 152b, 154b).

FIG. 12 and FIG. 19 illustrate also the air flow allowing deflection of the flow cell 1 into the manifold assembly 100. This air flow is illustrated by a continuous double arrowhead line. As shown in FIG. 12 and FIG. 19, air can be injected or sucked into/from the manifold assembly 100 via optional connector 150 to traverse channel 130, bores 62 and 52 of the gasket 60 and carrier chip 50, respectively, to reach an external surface of top substrate of the nanofluidic flow cell 1. As described hereinbefore, injecting air into the manifold assembly 100 (e.g. via connector 150) will create an air pressure on an external surface of the top substrate of the flow cell 1, thereby deflecting downwardly the top substrate. To the contrary, sucking air will pull the top substrate, thereby deflecting upwardly the top substrate of the flow cell 1.

Although not illustrated, the manifold assembly may also include tubes extending into the bores (e.g. to substitute for the connectors).

Also, although the illustrated embodiments of the carrier, gasket and manifold assembly are configured for operation with a nanofluidic cell including two (2) microchannels and four (4) fluid ports, the present invention encompasses more complex systems adapted for operation with a nanofluidic cell including more than two microchannels (e.g. 3, 4, 5, etc.) as well as more simple system configured for operation with a nanofluidic cell including one single microchannel having only one or more than one inlet (e.g. Y-shaped). Similarly, even more complex manifold assembly could be devised and configured for operation with a plurality of flow cells simultaneously (e.g. see sheet of FIG. 10). Those skilled in the art will readily realise how to adapt the present invention to such additional systems, for instance by adding or removing bores to the carrier, gasket, manifold assembly, etc.

Kit

According to another aspect, the invention relates to a kit comprising: (i) at least one of a chip as defined herein and a nanofluidic flow cell as defined herein; and (ii) a manifold assembly for holding said at least one chip or flow cell, wherein said manifold assembly is adapted for microscopy.

Furthermore, kits can include one single chip or a plurality of chips and as defined herein together with products for surface treatments and/or for surface modification (e.g. chemicals, biologicals), products for surface cleansing and/or passivation, tools for manipulating the flow cell (e.g. tweezers), instructions for using the chip and/or flow cell, etc.

Applications

The invention may be used for confinement and imaging of molecules, nanoparticles and other bio/nano materials and may find applications for therapeutics (such as drug development and discovery) and diagnostics (such as DNA sequencing and mapping, biomarker sensing), as well nanomaterials development (such as cosmetics, biofuels, nanomedicines).

Particularity, the present invention may find numerous applications in the field of molecular biology, including but not limited to studies and experiments relating to enzyme-DNA procession rate, DNA extension, higher-order structure, DNA ligation efficiency, kinetics, diffusion, size, aggregation of molecules or particles, encapsulation and dissolution dynamics and kinetics, residence time, etc. Further to this, all of these properties can be measured in response to the perfusion of reagents and over a wide range of imaging and confinement conditions.

For instance, using a nanofluidic flow cell having used linear grooves may be helpful for visualizing and developing functional assays to quantify the interactions between DNA which have been extended in the grooves, and molecules such as enzymes, guiding nucleic acids such as RNA, proteins etc. These assays have applications to CRISPR therapeutics and gene editing, as well as applications to diagnostics such as nanopore-based sequencing (where confining molecules to the grooves provides new control over the translocation of the DNA). Using a nanofluidic flow cell having circular grooves may be helpful in studies relating to ligation enhancement, catalysis and enzymatic processes. Using a nanofluidic flow cell having pits may be helpful when working with proteins, antibodies, nucleic acids, drugs, nanoparticles and a range of soft and small matter.

The nanoscale/microscale confinement features in accordance with the present invention may find applications for many purposes, including observing reaction kinetics, to measure diffusion and size, to linearize or control the conformations of DNA and polymers in grooves (e.g. circular grooves to provide precise control of ligation; custom control of molecular shapes depending on the degree of confinement, etc.).

In addition, single nanoparticle confinement and imaging in accordance with the present invention may find numerous useful applications including, but not limited to, measure diffusion and size, observe formation and dissolution, distinguish aggregates, in counting, binding, functionalization (e.g. resolve multiple fluorophores, observe interaction, binding, count individuals per cluster), for single molecule kinetics (binding indicated by change in mass, decrease in D, increase in intensity spatial variance), to observe hundreds of such interactions simultaneously.

Single nanoparticles nanoconfinement and imaging in accordance with the present invention may also useful to exchange reagents and observe in real time (e.g. polymers in grooves (length and conformation change), nanoparticles in pits (binding kinetics, aggregation, formation and dissolution), polymers in pits (enzyme processivity, activity), for studying DNA conformation, extension vs. salinity (DNA collapses in response to salinity), to observe response to salinity and pH changes, to observe agonism, antagonism, cooperativity, to observe, aggregation, encapsulation, release, etc.

Accordingly the nanofluidic flow cells and confinement systems in accordance with the present invention may provide numerous advantages including, but not limited to, observe molecular interactions one molecule at a time, in parallel; understand heterogeneity and sub-populations; distinguish and understand aggregates, enable developability; view entire reaction histories, not just snapshots in time; statistical power: observe hundreds of reactions simultaneously; wide dynamic range captures rare events; simple, flexible, easy to get started. By enabling multi-step and multi-component interactions to be observed, these systems can be used to develop, build, functionalize and understand a wide range of bio nano materials and their properties and uses.

The present invention may be amenable to commercial long-DNA sequencing and mapping technologies. The disclosed flow cell may allow adjustable-confinement technology, which might offer many key advantages compared to standard fixed-confinement technology, across the broader micro and nano fluidics industry.

Particularly, the present invention has demonstrated to be a powerful tool for controllably and gently manipulating long (~19 μm) DNA molecules into known configurations while maintaining their integrity. For example, long DNA can be loaded and linearized into nanogrooves while being imaged using fluorescence microscopy (see Example 1). This also applies to delicate protein-DNA complexes and chromatin whose structural integrity may be damaged by other nanofluidic devices, e.g. which apply larger sheer forces upon loading, and which may not be suitable for performing serial, multi-step reactions and visualizing their results.

Accordingly the nanofluidic flow cells and imaging systems of the present invention may be part of a scalable, general purpose sample-preparation platform, as well as imaging platform, which may be used for linearizing molecules hundreds of kilobases in length (or longer), with high throughput and yield, and which may be scalable by industry standards. Similarly embedded pits can be used in place of grooves, interactions between molecules, particles, and drugs can be studied in the pits, and this platform can be used to advance the fields of drug discovery, development and delivery.

Those skilled in the art will recognize, or be able to ascertain, using no more than routine experimentation, numerous equivalents to the specific procedures, embodiments, claims, and examples described herein. Such equivalents are considered to be within the scope of this invention, and covered by the claims appended hereto. The invention is further illustrated by the following examples, which should not be construed as further or specifically limiting.

EXAMPLES

Example 1

Preparation of Linear DNA Molecules in Nanochannels

Preparing linear DNA molecules in nanochannels is useful for genome mapping, DNA sequencing, CRISPR therapeutics, gene editing biotechnologies, as well as polymer physics studies and studies of protein-DNA and other chemical reactions.

To demonstrate operation of the miniaturized flow cell of the invention and ability to attain high confinement, miniaturized flow cells in accordance with FIGS. 1 and 2 were used to load and extend λ-phage DNA in linear nanogrooves via top-loading.

1. Sample Preparation

The λ DNA sample was prepared at a concentration of 50 ng/μl in 0.5× TBE buffer (45 mM Tris, 45 mM boric acid, and 1 mM EDTA) with 5% polyvinylpyrrolidone (PVP) added to reduce non-specific binding of DNA to the glass surfaces, as in prior work (D. Berard et al., Rev. Sci. Instrum. 84, 103704 (2013)). Three (3) μl of the sample was inserted into one of the reservoirs in the plastic flow cell carrier for the experiment.

2. DNA Loading and Confinement

The flow cell assembly (i.e. flow cell attached flow cell chip carrier like in FIG. 11) was first inserted into the aluminum clamp and mounted on the microscope. The DNA sample was then introduced into one of the reservoirs on the flow cell chip carrier using a pipette. The fluidic manifold was mounted on top of the flow cell and clamped down with screws to form a seal (see for instance FIGS. 12-19).

Air pressure was applied from a syringe into a tube in connection with the reservoir to propel the sample from the reservoir into the corresponding microchannel on the flow cell. Suction was then applied over an exterior surface of the top substrate using a syringe, this suction increasing the height of a nanoslit (or gap) so that the sample could be driven into it the nanoconfinement and imaging area by pressure applied to both ends of the microchannel. Then pressure was applied to the top substrate to increase the vertical confinement in the nanoslit and drive the DNA into the nanogrooves nanoconfinement and imaging area, where they adopt a linear confirmation.

Since the flow cell required ~25 kPa for full compression, fine control of the deflection and loading process could be obtained simply using a handheld syringe.

3. Imaging Parameters

Imaging parameters were similar to previous flow cell experiments (D. J. Berard et al., Appl. Phys. Lett. 109, 033702 (2016); D. J. Berard et al., Proc. Natl. Acad. Sci. 111, 13295 (2014)). YOYO-1-labeled DNA molecules were excited with a 488 nm semiconductor laser (Coherent Sapphire™) and imaged with a 100 NA 1.49 CFI Apo-TIRF™ objective (Nikon) on a Nikon Ti-E™ microscope equipped with a cooled electron-multiplying CCD (EMCCD) camera (Andor iXon Ultra™) acquiring frames at 50 ms exposure time with an electron multiplying (EM) gain of 300. This produces good image quality while resolving DNA length fluctuations within the nanogrooves. Data acquisition and microscope control was performed in Micromanager™ using custom add-on modules, as in prior work (D. Berard et al., Rev. Sci. Instrum. 84, 103704 (2013)).

4. Results

FIG. 21 shows a montage of the DNA linearization process. Briefly DNA molecules were first introduced into the nanoslit with suction applied to the membrane, and the pressure was gradually increased over 10-20 s to gently load the DNA into the nanogrooves. Up to 85% extension was observed. This extension was observed across a large region due to the low confinement gradient. The sample remains in focus as confinement is applied, and no focus correction is required during the loading process.

5. Conclusions

The present invention provides numerous benefits to existing microfluidic flow cells and confinement/imaging systems.

The device presented here builds on the current microfluidic flow cell technology, improving the stability and confinement gradient while greatly reducing the device size and simplifying the actuation mechanism. These advancements are important for advancing research applications such as protein-DNA interaction studies, diagnostics, and drug discovery and development.

The flow cell and system's operation were demonstrated by linearizing λ DNA in nanogrooves, achieving high stretching within the Odijk confinement regime, which is the most stringent available test for microfluidic flow cell techniques.

The central chamber geometry is formed with greater repeatability and predictability and is more stable due to the increased device rigidity. These improvements are expected to enable experiments with a higher degree of reproducibility and detailed control, eliminating manual alignment and refocusing procedures that are necessary with larger piezo-actuated instruments.

Fabrication throughput has been greatly increased due to the reduced flow cell size. In this work, flow cells were fabricated on 25 mm×25 mm substrates, yielding 36 devices each; and on 100 mm diameter of wafers, yielding 360 devices each.

The flow cell internal volume has been reduced from 5 µl to <50 nl compared to previous designs, a critical improvement when working with precious biological samples due to the high concentrations typically used in these kinds of experiments. This improvement alone opens the door to new applications which use precious biological samples.

Further, the use of pneumatic actuation allows the top substrate to be pressed against the bottom substrate such that an area of contact that increases with applied pressure is formed between them. This can seal molecules within large numbers of confinement structures, trapping them for indefinite periods.

In conclusion, the miniature implementation of a nanofluidic flow cell in accordance with the present invention will likely broaden the spectrum of single-molecule microscopy and application development across a wide range of fields.

Example 2

Improved Benefits of Using Air Pressure vs. a Conventional Convex Lens

Contact zone of an existing microfluidic cell (i.e. mechanical pressure) was compared to the contact zone of the nanofluidic cell of the invention (air pressure).

The graphic of FIG. 22 illustrates a variation of the height H of the gap between the top and bottom substrates of the flow cell in function of a distance from a point P where a first contact occurs between the two substrates. The line A illustrates the variation using a conventional convex lens whereas the line B illustrates the variation using air pressure. As shown, the contact zone Z is greater when using the air pressure than it is with conventional convex lenses. Moreover, it is possible to notice that the gradient using the air pressure is less than that using the convex lens. Stated otherwise, for a same variation of distance from the point P, the height variation between the substrates when using air pressure is less than when using the convex lens.

Headings are included herein for reference and to aid in locating certain sections. These headings are not intended to limit the scope of the concepts described therein, and these concepts may have applicability in other sections throughout the entire specification. Thus, the present invention is not intended to be limited to the embodiments shown herein but is to be accorded the widest scope consistent with the principles and novel features disclosed herein.

The singular forms "a", "an" and "the" include corresponding plural references unless the context clearly dictates otherwise. Thus, for example, reference to "a compound" includes one or more of such compound, and reference to "the method" includes reference to equivalent steps and methods known to those of ordinary skill in the art that could be modified or substituted for the methods described herein.

Unless otherwise indicated, all numbers expressing quantities of ingredients, reaction conditions, concentrations, properties, and so forth used in the specification and claims are to be understood as being modified in all instances by the term "about". At the very least, each numerical parameter should at least be construed in light of the number of reported significant digits and by applying ordinary rounding techniques. Accordingly, unless indicated to the contrary, the numerical parameters set forth in the present specification and attached claims are approximations that may vary depending upon the properties sought to be obtained. Notwithstanding that the numerical ranges and parameters setting forth the broad scope of the embodiments are approximations, the numerical values set forth in the specific examples are reported as precisely as possible. Any numerical value, however, inherently contains certain errors resulting from variations in experiments, testing measurements, statistical analyses and such.

It is understood that the examples and embodiments described herein are for illustrative purposes only and that various modifications or changes in light thereof will be suggested to persons skilled in the art and are to be included within the present invention and scope of the appended claims.

The invention claimed is:

1. A nanofluidic flow cell for single-molecule nanoconfinement and imaging of molecules in a fluid, comprising:
  a bottom substrate and a top substrate, the bottom and top substrate being bonded together;
  at least two spaced-apart microchannels and a central chamber carved in at least one of the bottom and top substrate, the microchannels and the central chamber defining an empty space into which a fluid can flow;
  said at least two microchannels extending on opposite side of the central chamber, each of said microchannels comprising a central portion crossing the central chamber and a pair of arms extending outside the central chamber, each arm comprising a fluid port positioned at opposite ends of the microchannel and outside the central chamber,
  wherein said central chamber comprises a nanoconfinement and imaging area, said area comprising a plurality of carved nanostructures configured for single-molecule nanoconfinement and imaging;
  wherein the top substrate is a flexible substrate having an external surface configured to be deflected by air pressure and/or air suction,
  wherein when air pressure is released over the external surface of the flexible substrate and/or when air suction is applied over the external surface flexible substrate, the flexible substrate increases a gap height between the flexible substrate and the central chamber, allowing a liquid sample to flow from the microchannel into the central chamber, and
  wherein when air pressure is applied over the external surface the flexible substrate, the flexible substrate closes a sap height between the flexible substrate and the central chamber, confining in the central chamber molecules present in said liquid sample.

2. The flow cell of claim 1, wherein the top substrate is adapted for being deflected at least over the central chamber.

3. The flow cell of claim 1, wherein at least one of the bottom substrate and top substrate are adapted for being deflected pneumatically.

4. The flow cell of claim 1, wherein at least one of the top substrate and bottom substrate is manufactured of a material allowing transmission of light at least inside the central chamber.

5. The flow cell of claim 1, wherein at least one of the top substrate and bottom substrate is manufactured of a material allowing transmission of light at least inside the central chamber for imaging with at least one of dark-field microscope, phase-contrast microscope, differential-interference-contrast microscope, ultraviolet microscope, fluorescence microscope, and confocal microscope.

6. The flow cell of claim 5, wherein the top substrate and the bottom substrate are made of glass.

7. The flow cell of claim 6, wherein the bottom substrate and top substrate are fusion-bonded.

8. The flow cell of claim 1, wherein said microchannels, central chamber and nanostructures are carved by at least one of photolithography, and electron-beam lithography, laser lithography, nanoimprint lithography, and interference lithography.

9. The flow cell of claim 8, wherein carving of said microchannels, central chamber and nanostructures further comprises chemical etching.

10. The flow cell of claim 1, wherein said microchannels, central chamber and/or nanostructures are carved by addition of materials on said substrate(s).

11. The flow cell of claim 1, wherein said carved nanostructures are selected from linear grooves, concentric circular grooves, ring shaped grooves, pits and combinations thereof.

12. The flow cell of claim 1, wherein said at least two microchannels each have a C-shape and together define with the central chamber a X-like shape.

13. The flow cell of claim 1, wherein said at least two microchannels are configured for introducing two separate fluids which can mix in the central chamber.

14. The flow cell of claim 1, wherein said flow cell comprises at least one additional microchannel, said additional microchannel comprising a central portion crossing the central chamber and a pair of arms extending outside the central chamber, each arm comprising a pair of fluid ports positioned at opposite ends of the microchannels and outside the central chamber.

15. A sheet comprising a plurality of nanofluidic flow cells as defined in claim 1.

16. The sheet of claim 15, wherein said sheet is adapted for cutting into multiple pieces, each piece resulting in an individual flow cell.

17. An imaging chip, comprising a carrier substrate onto which is bonded the flow cell of claim 1, said carrier substrate comprising at least four (4) reservoirs that connect to the fluid ports on the microchannels of the flow cell, and a central bore defining a void over the central chamber of the flow cell.

18. A method for nanoconfinement of molecules in a fluid, comprising:
providing a flow cell comprising of a bottom substrate, a top substrate, a central chamber and at least one microchannel crossing said central chamber, wherein the central chamber and the at least one microchannel are carved in at least one of said bottom and top substrate to define an empty space into which a fluid can flow, wherein at least one of the bottom substrate and top substrate is flexible and adapted for being deflected pneumatically;
loading a liquid sample comprising molecules into a fluid port positioned at one end of the microchannel while applying air pressure over an external surface of said flexible substrate, said air pressure preventing said liquid sample from entering the central chamber;
releasing said air pressure and/or applying air suction over an external surface of said flexible substrate to increase a gap height between the flexible substrate and the central chamber and allow said liquid sample to flow from the microchannel into the central chamber; and
applying air pressure over an external surface of said flexible substrate to close a gap between the flexible substrate and the central chamber and confine molecules in said liquid sample in the central chamber.

19. The method of claim 18, further comprising the step of applying pressure at said fluid port for controlling a flow of the fluid into the microchannel.

20. The method of claim 18, wherein said flow cell comprises at least two spaced-apart carved microchannels, wherein said at least two microchannels extend on opposite side of the central chamber, each of said microchannels comprising a central portion crossing the central chamber and a pair of arms extending outside the central chamber, each arm comprising a pair of fluid ports positioned at opposite ends of the microchannels and outside the central chamber; and
wherein said method comprises loading two separate fluids in said at least two microchannels and mixing said fluids in the central chamber when releasing said air pressure.

* * * * *